United States Patent
Meardi

(10) Patent No.: US 12,556,746 B2
(45) Date of Patent: Feb. 17, 2026

(54) ENTROPY CODING FOR SIGNAL ENHANCEMENT CODING

(71) Applicant: V-NOVA INTERNATIONAL LIMITED, London (GB)

(72) Inventor: Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/161,566

(22) Filed: Jan. 30, 2023

(65) Prior Publication Data

US 2023/0171430 A1 Jun. 1, 2023

Related U.S. Application Data

(63) Continuation of application No. 17/265,448, filed as application No. PCT/GB2019/052166 on Aug. 1, 2019, now Pat. No. 11,570,473.

(30) Foreign Application Priority Data

Aug. 3, 2018 (GB) ..................................... 1812708
Aug. 3, 2018 (GB) ..................................... 1812709

(Continued)

(51) Int. Cl.
*H04N 19/91* (2014.01)
*H04N 19/105* (2014.01)
(Continued)

(52) U.S. Cl.
CPC ........... *H04N 19/61* (2014.11); *H04N 19/105* (2014.11); *H04N 19/122* (2014.11);
(Continued)

(58) Field of Classification Search
CPC .... H04N 19/61; H04N 19/105; H04N 19/122; H04N 19/124; H04N 19/136;
(Continued)

(56) References Cited

U.S. PATENT DOCUMENTS 5,654,702 A 8/1997 Ran
6,134,349 A 10/2000 Terane
(Continued)

FOREIGN PATENT DOCUMENTS

EP 2816805 12/2014
WO 2007-011189 1/2007
(Continued)

OTHER PUBLICATIONS

Anonymous, "'H.264 and MPEG-4 Video Compression', chapter 6, H.264/MPEG4 Part 10", Iain E. Richardson, Not Known, Oct. 17, 2003, XP030001626, retrieved from the internet on Feb. 2, 2021 : URL: https://doc.lagout.org/network/H.264%20and%20MPEG4%20Video%20Compression.pdf.

(Continued)

*Primary Examiner* — Albert Kir
(74) *Attorney, Agent, or Firm* — Workman Nydegger

(57) ABSTRACT

There is provided a method of encoding a video signal, the method comprising: receiving an input frame; processing the input frame to generate at least one set of residuals data, the residuals data enabling a decoder to reconstruct the input frame from a reference reconstructed frame; and, applying a run-length coding operation to the set of residuals data, wherein the run-length coding operation comprises generating a run-length encoded bytestream comprising a set of symbols representing non-zero data values of the residuals data set and counts of consecutive zero values of the residuals data set. In certain embodiments the method comprises apply a Huffman coding operation to the set of (Continued)

symbols. A method of decoding is also provided as well as apparatuses and a computer readable medium.

17 Claims, 16 Drawing Sheets

(30) Foreign Application Priority Data

| | | |
|---|---|---|
| Aug. 3, 2018 | (GB) | 1812710 |
| Mar. 20, 2019 | (GB) | 1903844 |
| Mar. 23, 2019 | (GB) | 1904014 |
| Mar. 29, 2019 | (GB) | 1904492 |
| Apr. 15, 2019 | (GB) | 1905325 |

(51) Int. Cl.

| | |
|---|---|
| *H04N 19/122* | (2014.01) |
| *H04N 19/124* | (2014.01) |
| *H04N 19/136* | (2014.01) |
| *H04N 19/33* | (2014.01) |
| *H04N 19/36* | (2014.01) |
| *H04N 19/44* | (2014.01) |
| *H04N 19/46* | (2014.01) |
| *H04N 19/60* | (2014.01) |
| *H04N 19/61* | (2014.01) |
| *H04N 19/70* | (2014.01) |
| *H04N 19/93* | (2014.01) |

(52) U.S. Cl.
CPC ......... *H04N 19/124* (2014.11); *H04N 19/136* (2014.11); *H04N 19/33* (2014.11); *H04N 19/36* (2014.11); *H04N 19/44* (2014.11); *H04N 19/46* (2014.11); *H04N 19/60* (2014.11); *H04N 19/70* (2014.11); *H04N 19/91* (2014.11); *H04N 19/93* (2014.11)

(58) Field of Classification Search
CPC ........ H04N 19/33; H04N 19/36; H04N 19/44; H04N 19/46; H04N 19/60; H04N 19/70; H04N 19/91; H04N 19/93
USPC .................................................. 375/240.02
See application file for complete search history.

(56) References Cited

U.S. PATENT DOCUMENTS

| | | | | |
|---|---|---|---|---|
| 6,563,440 B1* | 5/2003 | Kangas | ............ | H03M 7/42 |
| | | | | 341/65 |
| 6,781,528 B1 | 8/2004 | Lin et al. | | |
| 8,410,959 B2* | 4/2013 | Karczewicz | ........ | H04N 19/197 |
| | | | | 382/233 |
| 9,197,890 B2 | 11/2015 | Sole et al. | | |
| 10,282,863 B2* | 5/2019 | Charikar | ............ | H04N 19/60 |
| 10,609,414 B2 | 3/2020 | Zhang et al. | | |
| 2002/0131084 A1 | 9/2002 | Andrew et al. | | |
| 2008/0101464 A1 | 5/2008 | Lei | | |
| 2009/0097548 A1 | 4/2009 | Karczewicz et al. | | |
| 2012/0163470 A1* | 6/2012 | Wu | ............ | H04N 19/176 |
| | | | | 375/240.23 |
| 2014/0195498 A1* | 7/2014 | Asher | ............ | H03M 7/6088 |
| | | | | 707/693 |
| 2015/0358031 A1* | 12/2015 | Wu | ............ | H03M 7/4037 |
| | | | | 341/65 |
| 2017/0063392 A1* | 3/2017 | Kalevo | ............ | H03M 7/4006 |
| 2018/0220160 A1* | 8/2018 | Lu | ............ | H04N 19/117 |
| 2018/0253559 A1* | 9/2018 | Satpathy | ............ | H04L 9/0631 |
| 2020/0274552 A1* | 8/2020 | Rigo | ............ | H03M 7/6088 |
| 2023/0115821 A1* | 4/2023 | Jannard | ............ | G06T 5/70 |
| | | | | 382/274 |
| 2023/0171430 A1* | 6/2023 | Meardi | ............ | H04N 19/61 |
| | | | | 375/240.02 |

FOREIGN PATENT DOCUMENTS

| | | |
|---|---|---|
| WO | 2013-171173 | 11/2013 |
| WO | 2014-025741 | 2/2014 |

OTHER PUBLICATIONS

International Search Report and Written Opinion for PCT/GB2019/052166 mailed Oct. 30, 2019.

"Working Draft of Low Complexity Enhancement Video Coding", 126. MPEG Meeting, Mar. 25, 2019 to Mar. 29, 2019, Geneva (Motion Picture Expert Group or ISO/IEC JTC1/SC29/WG11), No. n18454, Apr. 18, 2019, XP030208724, retrieved from the internet on Feb. 1, 2021: URL: https://mpeg.chiariglione.org/meetings/126.

Han, "Comparison of Commonly Used Image Interpolation Methods", Proceedings of the 2nd International Conference on Computer Science and Electronics Engineering (ICCSEE 2013), Mar. 23, 2013; 1077952576-1077952576, XP055576828.

Schwarz et al., "Overview of the Scalable Video Coding Extension of the H.264/AVC Standard", IEEE Transactions on Circuits and Systems for Video Technology, Sep. 1, 2007 IEEE, USA, vol. 17, Nr: 9, pp. 1103-1120, XP055378169.

Non-Final Rejection Mailed on Apr. 14, 2022 for U.S. Appl. No. 17/265,448, 17 page(s).

Notice of Allowance received for U.S. Appl. No. 17/265,448, mailed on Sep. 28, 2022, 8 pages.

Office Action received for Australian Patent Application No. 2023204360, mailed on Jul. 29, 2024, 3 pages.

* cited by examiner

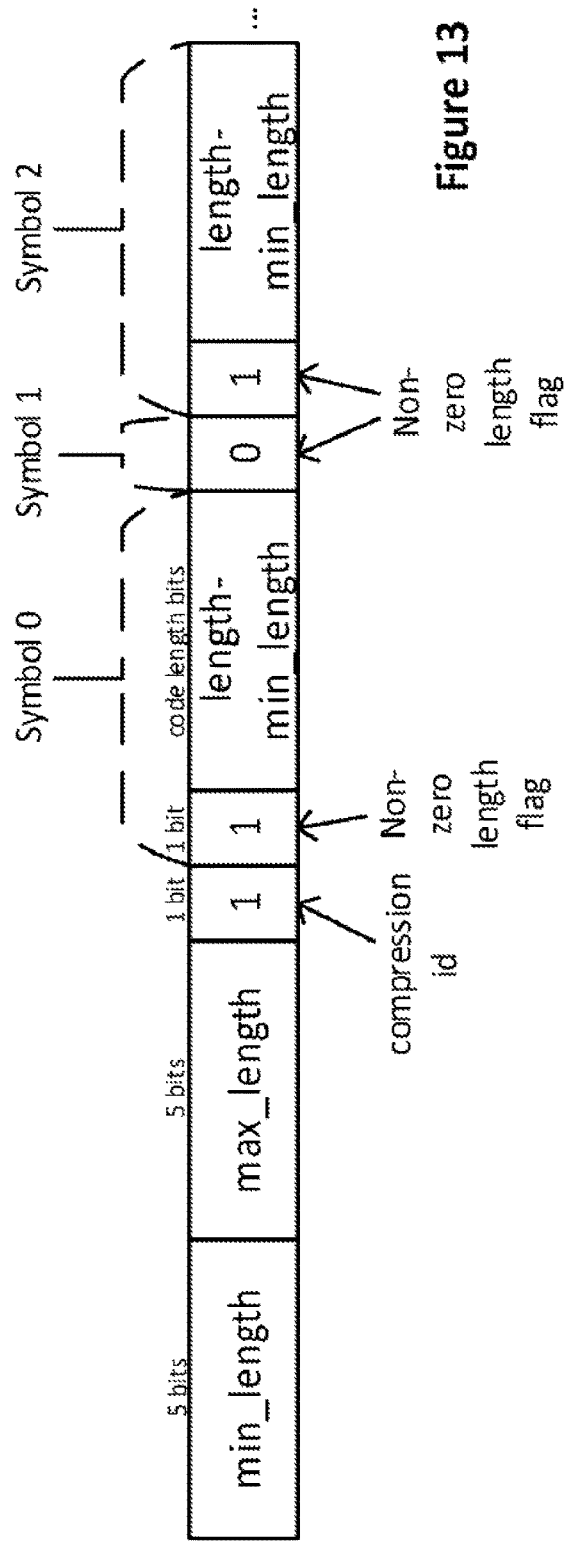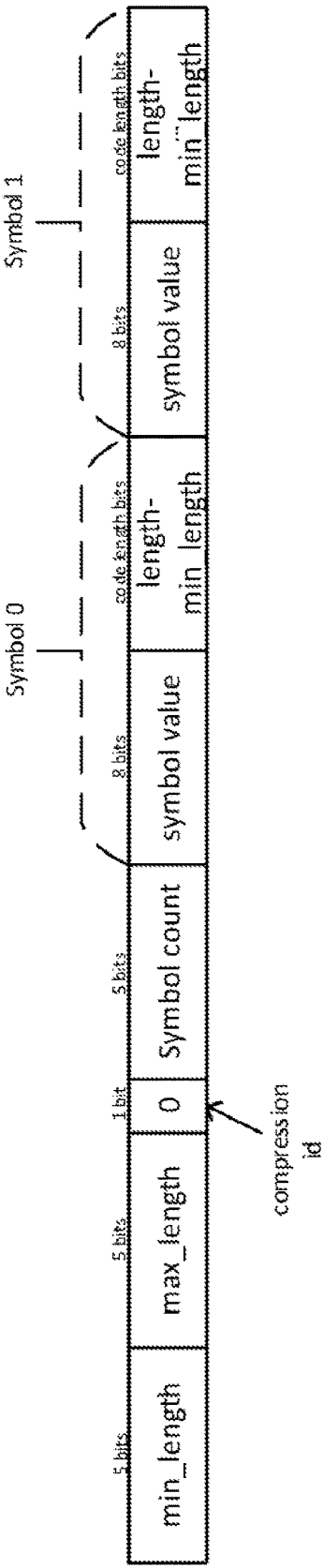

ENTROPY CODING FOR SIGNAL ENHANCEMENT CODING

CROSS-REFERENCE TO RELATED APPLICATIONS

The present application is a continuation of U.S. patent application Ser. No. 17/265,448, filed Feb. 2, 2021, which is a 371 US National Stage Entry of PCT/GB2019/052166, filed Aug. 1, 2019, which claims priority to
UK Patent Application No. 1905325.5, filed Apr. 15, 2019,
UK Patent Application No. 1904492.4, filed Mar. 29, 2019,
UK Patent Application No. 1904014.6, filed Mar. 23, 2019,
UK Patent Application No. 1903844.7, filed Mar. 20, 2019,
UK Patent Application No. 1812710.0, filed Aug. 3, 2018,
UK Patent Application No. 1812709.2, filed Aug. 3, 2018,
UK Patent Application No. 1812708.4, filed Aug. 3, 2018.
the entire disclosures of which are incorporated herein by reference.

BACKGROUND

A hybrid backward-compatible coding technology has been previously proposed, for example in WO 2014/170819 and WO 2018/046940, the contents of which are incorporated herein by reference.

A method is proposed therein which parses a data stream into first portions of encoded data and second portions of encoded data; implements a first decoder to decode the first portions of encoded data into a first rendition of a signal; implements a second decoder to decode the second portions of encoded data into reconstruction data, the reconstruction data specifying how to modify the first rendition of the signal; and applies the reconstruction data to the first rendition of the signal to produce a second rendition of the signal.

An addition is further proposed therein in which a set of residual elements is useable to reconstruct a rendition of a first time sample of a signal. A set of spatio-temporal correlation elements associated with the first time sample is generated. The set of spatio-temporal correlation elements is indicative of an extent of spatial correlation between a plurality of residual elements and an extent of temporal correlation between first reference data based on the rendition and second reference data based on a rendition of a second time sample of the signal. The set of spatio-temporal correlation elements is used to generate output data.

Typical video coding technologies involve applying an entropy coding operation to output data. There is a need for a low complexity, simple and fast entropy coding scheme to apply data compression to the reconstruction data or residual elements of the above proposed technologies or other similar residual data.

SUMMARY OF THE INVENTION

According to aspects of the invention there is provided a method of entropy encoding or decoding residual data where residual data can be used to correct or enhance data of a base stream, for example a frame of a video encoded using a legacy video coding technology.

According to an aspect of the invention there is provided a method of encoding a video signal. The method comprises: receiving an input frame; processing the input frame to generate residual data, the residual data enabling a decoder to reconstruct the input frame from a reference reconstructed frame; and, applying a run-length coding operation to the residual data, wherein the run-length coding operation comprises generating a run-length encoded bytestream comprising a set of symbols representing non-zero data values of the residual data and counts of consecutive zero values of the residual data.

In this way the method of encoding provides for a low complexity, simple and fast solution to data compression of the residual data. The solution takes advantage of the unique characteristics of the residual data such as the relative occurrence of zero values, the likely grouping of the zero values based on a scan order of a transform process of generating the residual data (if a transform is used) and the relative variety of the data values yet their potential relative frequency/infrequency in the residual data.

The set of symbols may be sequential in the encoded bytestream. Counts of consecutive zero values may also be referred to as a run of zeros. The residual data upon which the run-length coding operation is performed may represent quantised residual data, preferably a quantised set of transform coefficients. The quantised set of transform coefficients may be ordered by layer, that is, by sets of coefficients of the same type, by plane, by level of quality, or by surface. These terms are further described and defined herein. The symbols may be sequential in a corresponding scan order of the transform operation such that the residual data can be easily matched to a reference reconstructed frame.

Preferably the run-length coding operation comprises: encoding non-zero data values of the residual data into at least a first type of symbol; and, encoding counts of consecutive zero values into a second type of symbol, such that the residual data is encoded as a sequence of symbols of different types. Thus, the residual data may be encoded as a sequence of symbols comprising a data value type and a run of zeros type. The types facilitate speed and ease of decoding at the decoder but also facilitate a further entropy coding operation as elaborated below. Structuring the data into a minimised set of fixed-length codes of different types is beneficial for subsequent steps.

In certain embodiments, the run-length coding operation comprises: encoding data values of the residual data into a first type of symbol and a third type of symbol, the first and third types of symbol each comprising a part of a data value, such that the parts can be combined at a decoder to reconstruct the data value. Each type of symbol may have a fixed size and may be a byte. Data values larger than a threshold or larger than a size available in a type of symbol can be easily transmitted or stored using the bytestream. Structuring the data into bytes or symbols not only facilitates decoding but also facilitates entropy coding of fixed length symbols as set out below. Introducing the third type of symbol allows three types of symbols to be easily distinguished form one another at the decoder side. Where we refer to types of symbols, the terms blocks, bytes (where the symbol is a byte) contexts, or types could be used.

The run-length coding operation may comprise: comparing a size of each data value of the residual data to be encoded to a threshold; and, encoding each data value into the first type of symbol if the size is below the threshold and encoding a part of each data value into the first type of symbol and a part of each data value into the third type of symbol if the size is above the threshold.

If the size is above the threshold, the method may comprise setting a flag in the symbol of the first type of symbol indicating a part of the represented data value is encoded into a further symbol of the third type of symbol. The flag may be an overflow flag or overflow bit and may in certain examples be the least significant bit of the symbol or byte. Where the least significant bit of the symbol is a flag, the data value or part of the data value may be comprised in the remaining bits of the byte. Setting the overflow bit as the least significant bit facilitates ease of combination with subsequent symbols.

The method may further comprise inserting a flag in each symbol indicating a type of symbol encoded next in the run-length encoded bytestream. The flag may be an overflow bit as described above or may further be a run flag or run bit indicating whether or not the next symbol comprises a run of zeros or a data value or a part of a data value. Where the flag represents if the next symbol comprises a run (or a count of consecutive zeros) the flag may be a bit of the symbol, preferably a most significant bit of the symbol. The count of consecutive zeros or the data value may be comprised in the remaining bits of the symbol. Thus, the 'run of zeros' or second type of symbol comprises 7 available bits of the byte for a count and the 'data' or first type of symbol comprises 6 available bits for a data value where the overflow bit is not set and 7 available bits for a data value where the overflow bit is set.

In sum, the flag may be different for each type of symbol and may indicate the type of symbol next in the stream.

In preferred embodiments of the above aspect, the method further comprises applying a further entropy coding operation to the set of symbols produced by the run-length encoded operation. Thus, fixed length symbols deliberately produced by the structure of the run-length coding operation can be converted into variable length codes to reduce the overall size of the data. The run-length coding structure is designed in order to create fixed length symbols of high frequency to facilitate an improved further entropy coding operation and an overall reduction in data size. The further entropy coding operation takes advantage of the probability or frequency of a symbol occurring in the bytestream created by the run-length coding operation.

In a preferred example, the further entropy coding operation is a Huffman coding operation or an arithmetic coding operation. Preferably the method further comprises applying a Huffman coding operation to the set of symbols to generate Huffman encoded data comprising a set of codes representing the run-length encoded bytestream. The Huffman coding operation receives as inputs symbols of the run-length coded bytestream and outputs a plurality of variable-length codes in a bitstream. Huffman coding is a coding technique that can effectively reduce fixed length codes. The structure of the run-length coded bytes means that symbols of the two types are highly likely to be replicated frequently which means that only a few bits will be needed for each recurring symbol. Across a plane, the same data value is likely to be replicated (particularly where the residuals are quantised) and thus the variable length code may be small (but repeated).

Huffman coding is also well optimised for software implementation (as anticipated here) and is computationally efficient. It uses minimal memory and has faster decoding when compared to other entropy coding techniques, as the processing steps involve merely stepping through a tree. Computational benefits arise from the shape and depth of the tree created by the specifically designed run-length coding operation.

The coding operations may be performed on a group of coefficients, that is, a layer, on a plane of a frame, on a level of quality, or on a whole surface or frame. That is, the statistics or parameters of each operation may be determined based on the group of data values and zero data values to be encoded or the symbols representing those values.

The Huffman coding operation may be a canonical Huffman coding operation, such that the Huffman encoded data comprises a code length for each unique symbol of the set of symbols, the code length representing a length of a code used to encode a corresponding symbol. Canonical Huffman encoding facilitates a reduction in coding parameters that need to be signalled between the encoder and the decoder in metadata by ensuring that identical code lengths are attached to symbols in a sequential manner. The codebook for the decoder can be inferred and only the code lengths need to be sent. Thus, the canonical Huffman encoder is particularly efficient for shallow trees where there are a large number of different data values.

In certain examples, the method further comprises comparing a data size of at least a portion of the run-length encoded bytestream to a data size of at least a portion of the Huffman encoded data; and, outputting the run-length encoded bytestream or the Huffman encoded data in an output bitstream based on the comparison. Each block or section of the input data is thus selectively sent to reduce the overall data size ensuring the decoder can easily differentiate between the types of encoding. The difference may be within a threshold or tolerance such that although one scheme may result in smaller data, computational efficiencies may mean that one scheme is preferred.

To distinguish between schemes, the method may further comprise adding a flag to configuration metadata accompanying the output bitstream indicating if the bitstream represents the run-length encoded bytestream or the Huffman encoded data. This is a quick and efficient manner of signalling. Alternatively, the decoder may identify the scheme used from the structure of the data, for example, the Huffman coded data may have a header part and a data part while the run-length coded data may comprise only a data part and thus the decoder may be able to distinguish between the two schemes.

The Huffman coding operation may comprise generating a separate frequency table for symbols of the first type of symbol and symbols of the second type of symbol. Further, a separate Huffman coding operation may be applied for each type of symbol. These concepts facilitate particular efficiency of the variable length coding scheme. For example, where the same data value is replicated across a plane, as is likely in video coding where a scene may have similar colours or errors/enhancements, only a few codes may be needed for these values (where the codes are not distorted by the 'run of zeros' type of symbol). Thus, this embodiment of the invention is particularly advantageous for use in conjunction with the run-length coding operation above. As noted above, where the values are quantised, the symbols there may be replicated and may not be too many different values within the same frame or group of coefficients.

Using a different frequency table for each type of symbol provides a particular benefit in the Huffman coding operation following the specifically designed run-length coding operation.

The method may thus comprise identifying a type of symbol to be encoded next, selecting a frequency table based on the type of next symbol, decoding the next symbol using the selected frequency table and outputting the encoded symbol in sequence. A frequency table may correspond to a unique codebook.

The method may comprise generating a stream header which may comprise an indication of the plurality of code lengths, such that a decoder can derive code lengths and respective corresponding symbols for the canonical Huffman decoding operation. The code lengths may for example be the length of each code used to encode a particular symbol. A code length therefore has a corresponding code and a corresponding symbol. The stream header may be a first type of stream header and further comprises an indication of the symbol associated with a respective code length of the plurality of code lengths. Alternatively the stream header may be a second type of stream header and the method may further comprise ordering the plurality of code lengths in the stream header based on a predetermined order of symbols corresponding to each of the code lengths, such that the code lengths can be associated with a corresponding symbol at the decoder. Each type will provide efficient signalling of the coding parameters depending on the symbols and lengths to be decoded. The code lengths may be signalled as a difference between the length and another length, preferably a signalled minimum code length.

The second type of stream header may further comprise a flag indicating a symbol in the predetermined order of the possible set of symbols does not exist in the set of symbols in the run-length encoded bytestream. In this way only lengths needed need to be included in the header.

The method may further comprise comparing a number of unique codes in the Huffman encoded data to a threshold and generating the first type of stream header or the second type of stream header based on the comparison.

The method may further comprise comparing a number of non-zero symbols or data symbols to a threshold and generating the first type of stream header or the second type of stream header based on the comparison.

According to a further aspect of the invention there may be provided a method of decoding a video signal, the method comprising: retrieving an encoded bitstream; decoding the encoded bitstream to generate residual data, and, reconstructing an original frame of the video signal from the residual data and a reference reconstructed frame, wherein the step of decoding the encoded bitstream comprises: applying a run-length coding operation to generate the residual data, wherein the run-length coding operation comprises identifying a set of symbols representing non-zero data values of the residual data and a set of symbols representing counts of consecutive zero values of the residual data; parsing the set of symbols to derive the non-zero data values of the residual data and the counts of consecutive zero values; and, generating the residual data from the non-zero data values and the counts of consecutive zero values.

The run-length coding operation may comprise: identifying symbols of a first type of symbol representing non-zero data values of the residual data; identifying symbols of a second type of symbol representing counts of consecutive zero values, such that a sequence of symbols of different types is decoded to generate the residual data; and, parsing the set of symbols according the respective type of each symbol.

The run-length coding operation may comprises identifying symbols of a first type of symbol and symbols of a third type of symbol, the first and third types of symbol each representing a part of a data value; parsing a symbol of the first type of symbol and a symbol of the third type of symbol to derive parts of a data value; and, combining the derived parts of the data value into a data value.

The method may further comprise: retrieving an overflow flag from a symbol of the first type of symbol indicating if a part of a data value of the symbol of the first type of symbol is comprised in a subsequent third type of symbol.

The method may further comprise retrieving a flag from each symbol indicating a subsequent type of symbol to be expected in the set of symbols.

An initial symbol may be assumed to be the first type of symbol, such that the initial symbol is parsed to derive at least a part of a data value.

The step of decoding the encoded bitstream may comprise applying a Huffman coding operation to the encoded bitstream to generate the set of symbols representing non-zero data values of the residual data and the set of symbols representing counts of consecutive zero values of the residual data, wherein the step of applying a run-length coding operation to generate the residual data is performed on the sets of symbols.

The Huffman coding operation may be a canonical Huffman coding operation.

The method may further comprise retrieving a flag from configuration metadata accompanying the encoded bitstream indicating if the encoded bitstream comprises a run-length encoded bytestream or Huffman encoded data; and, selectively applying the Huffman coding operation based on the flag.

The method may further comprise: identifying an initial type symbol expected to be derived in the encoded bitstream; applying the Huffman coding operation to the encoded bitstream to derive an initial symbol based on a set of coding parameters associated with the initial type of symbol expected; retrieving a flag from the initial symbol indicating a subsequent type of symbol expected to be derived from the bitstream; and, further applying the Huffman coding operation to the bitstream to derive a subsequent symbol based on a set of coding parameters associated with the subsequent type of symbol expected to be derived from the bitstream.

The method may further comprise iteratively retrieving a flag from a decoded symbol indicating a subsequent type of symbol expected to be derived from the bitstream and applying the Huffman coding operation to the bitstream to derive a subsequent symbol based on a set of coding parameters associated with the subsequent type of symbol expected to be derived from the bitstream.

Thus, the method may comprise the steps of decoding a symbol using a Huffman coding operation, decoding a symbol using a run-length coding operation, identifying a type of symbol expected next from the run-length coding operation and decoding a next symbol using a Huffman coding operation.

The method may further comprise: retrieving a stream header comprising an indication of a plurality of code lengths to be used for the canonical Huffman coding operation; associating each code length with a respective symbol in accordance with the canonical Huffman coding operation; and, identifying a code associated with each symbol based on the code lengths according to the canonical Huffman coding operation. Thus, the codes may be associated with sequential symbols where the code lengths are identical.

The stream header may comprise an indication of a symbol associated with a respective code length of the plurality of code lengths and the step of associating each code length with a symbol comprises associating each code length with the corresponding symbol in the stream header.

The step of associating each code length with a respective symbol comprises associating each code length with a symbol of a set of predetermined symbols in accordance with an order in which each code length was retrieved.

The method may further comprise not associating a symbol of the set of predetermined symbols with a respective code length where a flag of the stream header indicates no code length exists in the stream header for that symbol.

According to an aspect of the invention there is provided a method of encoding a video signal. The method comprises: receiving an input frame; processing the input frame to generate residual data, the residual data enabling a decoder to reconstruct the input frame from a reference reconstructed frame; and, applying a Huffman coding operation to the residual data, wherein the Huffman operation comprises generating an encoded bitstream comprising a set of codes encoding a set of symbols representing the residual data.

According to a further aspect of the invention there may be provided a method of decoding a video signal, the method comprising: retrieving an encoded bitstream; decoding the encoded bitstream to generate residual data, and, reconstructing an original frame of the video signal from the residual data and a reference reconstructed frame, wherein the step of decoding the encoded bitstream comprises: applying a Huffman coding operation to generate the residual data, wherein the Huffman coding operation comprises generating a set of symbols representing the residual data by comparing the encoded bitstream to a reference mapping codes to a corresponding symbol and generating the residual data from the non-zero data values and the counts of consecutive zero values.

According to a further aspect there may be provided an apparatus for encoding a data set into an encoded data set. The apparatus configured to encode an input video according to the above steps. The apparatus may comprise a processor configured to carry out the method of any of the above aspects.

According to a further aspect there may be provided an apparatus for decoding a data set into a reconstructed video from a data set. The apparatus configured to decode an output video according to the above steps. The apparatus may comprise a processor configured to carry out the method of any of the above aspects.

An encoder and decoder may also be provided.

According to further aspects of the invention there may be provided computer readable media which when executed by a processor cause the processor to perform any of the methods of the above aspects.

DETAILED DESCRIPTION

Examples of systems and methods in accordance with the invention will now be described with reference to the accompanying drawings, in which:—

FIG. 13 shows a structure of a first stream header;

FIG. 14 shows a structure of a second stream header;

Figure 1:
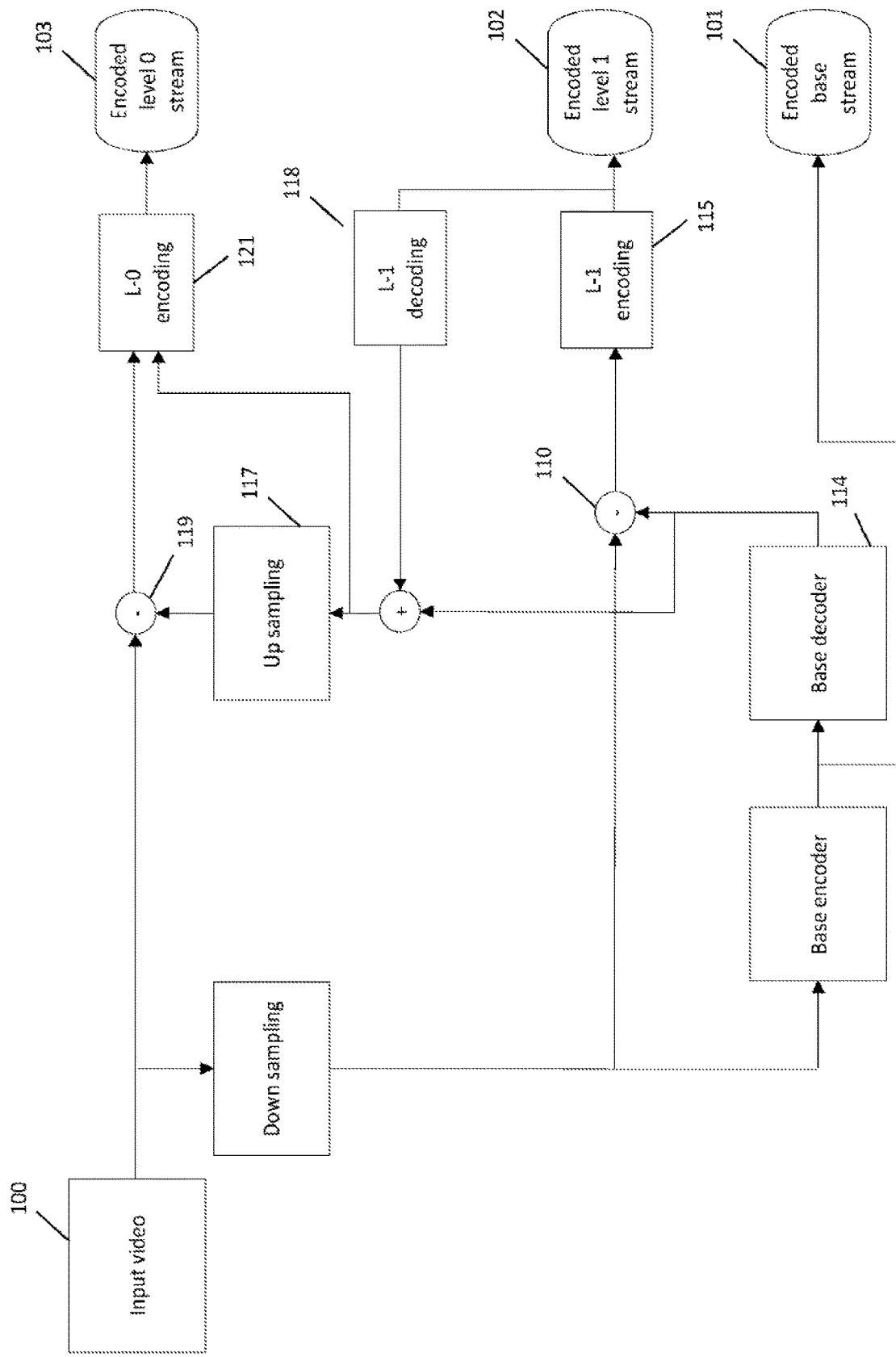
FIG. 1 shows a high-level schematic of an encoding process.

The present invention relates to methods. In particular, the present invention relates to methods for encoding and decoding signals. Processing data may include, but is not limited to, obtaining, deriving, outputting, receiving and reconstructing data.

The coding technology discussed herein is a flexible, adaptable, highly efficient and computationally inexpensive coding format which combines a video coding format, a base codec, (e.g. AVC, HEVC, or any other present or future codec) with an enhancement level of coded data, encoded using a different technique.

The technology uses a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. It is worth noting that typically the base stream is expected to be decodable by a hardware decoder while the enhancement stream is expected to be suitable for software processing implementation with suitable power consumption.

Methods and systems for efficiently transmitting and storing the enhancement encoded information are needed.

It is important that any entropy coding operation used in the new coding technology is tailored to the specific requirements or constraints of the enhancement stream and is of low complexity. Such requirements or constraints include: the potential reduction in computational capability resulting from the need for software decoding of the enhancement stream; the need for combination of a decoded set of residuals with a decoded frame; the likely structure of the residual data, i.e. the relatively high proportion of zero values with highly variable data values over a large range; the nuances of the input quantized block of coefficients; and, the structure of the enhancement stream being a set of discrete residual frames separated into planes, layers, etc. The entropy coding must also be suitable for multiple levels of enhancement within the enhancement stream.

Investigation by the inventors has established that contemporary entropy coding schemes used in video, such as context-based adaptive binary arithmetic coding (CABAC) or Context-adaptive variable-length coding (CAVLC), are unlikely to be appropriate. For example, predictive mechanisms may be unnecessary or may not yield sufficient benefits to compensate for their computational burdens given the structure of the input data. Moreover, arithmetic coding is generally computationally expensive and implementation in software is often undesirable.

Note that the constraints placed on the enhancement stream mean that a simple and fast entropy coding operation is essential to enable the enhancement stream to effectively correct or enhance individual frames of the base decoded video. Note that in some scenarios the base stream is also being decoded substantially simultaneously before combination, putting a strain on resources.

This present document preferably fulfils the requirements of the following ISO/IEC documents: "Call for Proposals for Low Complexity Video Coding Enhancements" ISO/IEC JTC1/SC29/WG11 N17944, Macao, CN, October 2018 and "Requirements for Low Complexity Video Coding Enhancements" ISO/IEC JTC1/SC29/WG11 N18098, Macao, CN, October 2018. Moreover, approaches described herein may be incorporated into PERSEUS® products as supplied by V-Nova International Ltd.

The general structure of the proposed encoding scheme in which the presently described techniques can be applied, uses a down-sampled source signal encoded with a base codec, adds a first level of correction data to the decoded output of the base codec to generate a corrected picture, and then adds a further level of enhancement data to an up-sampled version of the corrected picture.

Thus, the streams are considered to be a base stream and an enhancement stream. It is worth noting that typically the base stream is expected to be decodable by a hardware decoder while the enhancement stream is expected to be suitable for software processing implementation with suitable power consumption.

This structure creates a plurality of degrees of freedom that allow great flexibility and adaptability to many situations, thus making the coding format suitable for many use cases including Over-The-Top (OTT) transmission, live streaming, live Ultra High Definition (UHD) broadcast, and so on.

Although the decoded output of the base codec is not intended for viewing, it is a fully decoded video at a lower resolution, making the output compatible with existing decoders and, where considered suitable, also usable as a lower resolution output.

In general residuals refer to a difference between a value of a reference array or reference frame and an actual array or frame of data. It should be noted that this generalised example is agnostic as to the encoding operations performed and the nature of the input signal. Reference to "residual data" as used herein refers to data derived from a set of residuals, e.g. a set of residuals themselves or an output of a set of data processing operations that are performed on the set of residuals.

In certain examples described herein, a number of encoded streams may be generated and sent independently to a decoder. That is, in example methods of encoding a signal, the signal may be encoded using at least two levels of encoding. A first level of encoding may be performed using a first encoding algorithm and a second level may be encoded using a second encoding algorithm. The method may comprise: obtaining a first portion of a bitstream by encoding the first level of the signal; obtaining a second portion of a bitstream by encoding the second level of the signal; and sending the first portion of the bitstream and the second portion of the bytestream as two independent bitstreams.

It should be noted that the entropy coding technique proposed herein is not limited to the multiple LoQs proposed in the Figures but provides utility in any residual data used to provide enhancement or correction to a frame of a video reconstructed from an encoded stream encoded using a legacy video coding technology such as HEVC. For example, the utility of the coding technique in encoding residual data of different LoQs is particularly beneficial.

Note, we provide examples of encoding and decoding in FIGS. 1 to 5 of schemes in which the entropy coding techniques provided herein may provide utility, but it will be understood that the coding technique may be generally utilised to encode residual data.

Certain examples described herein relate to a generalised encoding and decoding process that provides a hierarchical, scaleable flexible coding technology. The first portion of a bitstream or first independent bitstream may be decoded using a first decoding algorithm, and the second portion of the bitstream or second or independent bitstream may be decoded using a second decoding algorithm. The first decoding algorithm is capable of being decoded by a legacy decoder using legacy hardware.

Returning to the initial process described above providing a base stream and two levels of enhancement within an enhancement stream, an example of a generalised encoding process is depicted in the block diagram of FIG. 1. An input full resolution video 100 is processed to generate various encoded streams 101, 102, 103. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between the reconstructed base codec video and the down-sampled version of the input video. A third encoded stream (encoded level 0 stream) is produced by processing the residuals obtained by taking the difference between an up-sampled version of a corrected version of the reconstructed base coded video and the input video.

A down-sampling operation may be applied to the input video to produce a down-sampled video to be encoded by a base codec. The down-sampling can be done either in both vertical and horizontal directions, or alternatively only in the horizontal direction.

Each enhancement stream encoding process may not necessarily include an up-sampling step. In FIG. 1 for example, the first enhancement stream is conceptually a correction stream while the second enhancement stream is up-sampled to provide a level of enhancement.

Looking at the process of generating the enhancement streams in more detail, to generate the encoded Level 1 stream, the encoded base stream is decoded 114 (i.e. a decoding operation is applied to the encoded base stream to generate a decoded base stream). The difference between the decoded base stream and the down-sampled input video is then created 110 (i.e. a subtraction operation is applied to the down-sampled input video and the decoded base stream to generate a first set of residuals).

Here the term residuals is used in the same manner as that known in the art, that is, the error between a reference frame a desired frame. Here the reference frame is the decoded base stream and the desired frame is the down-sampled input video. Thus, the residuals used in the first enhancement level can be considered as a corrected video as they 'correct' the decoded base stream to the down-sampled input video that was used in the base encoding operation.

Again, the later described entropy coding operation is suitable for any residual data, e.g. any data associated with a set of residuals.

The difference is then encoded 115 to generate the encoded Level 1 stream 102 (i.e. an encoding operation is applied to the first set of residuals to generate a first enhancement stream).

As noted above, the enhancement stream may comprise a first level of enhancement 102 and a second level of enhancement 103. The first level of enhancement 102 may be considered to be a corrected stream. The second level of enhancement 103 may be considered to be a further level of enhancement that converts the corrected stream to the original input video.

The further level of enhancement 103 is created by encoding a further set of residuals which are the difference 119 between an up-sampled 117 version of a decoded 118 level 1 stream and the input video 100.

As noted, an up-sampled stream is compared to the input video which creates a further set of residuals (i.e. a difference operation is applied to the up-sampled re-created stream to generate a further set of residuals). The further set of residuals are then encoded 121 as the encoded Level 0 enhancement stream (i.e. an encoding operation is then applied to the further set of residuals to generate an encoded further enhancement stream).

Thus, as illustrated in FIG. 1 and described above, the output of the encoding process is a base stream 101 and one or more enhancement streams 102, 103 which preferably comprise a first level of enhancement and a further level of enhancement.

Figure 2:
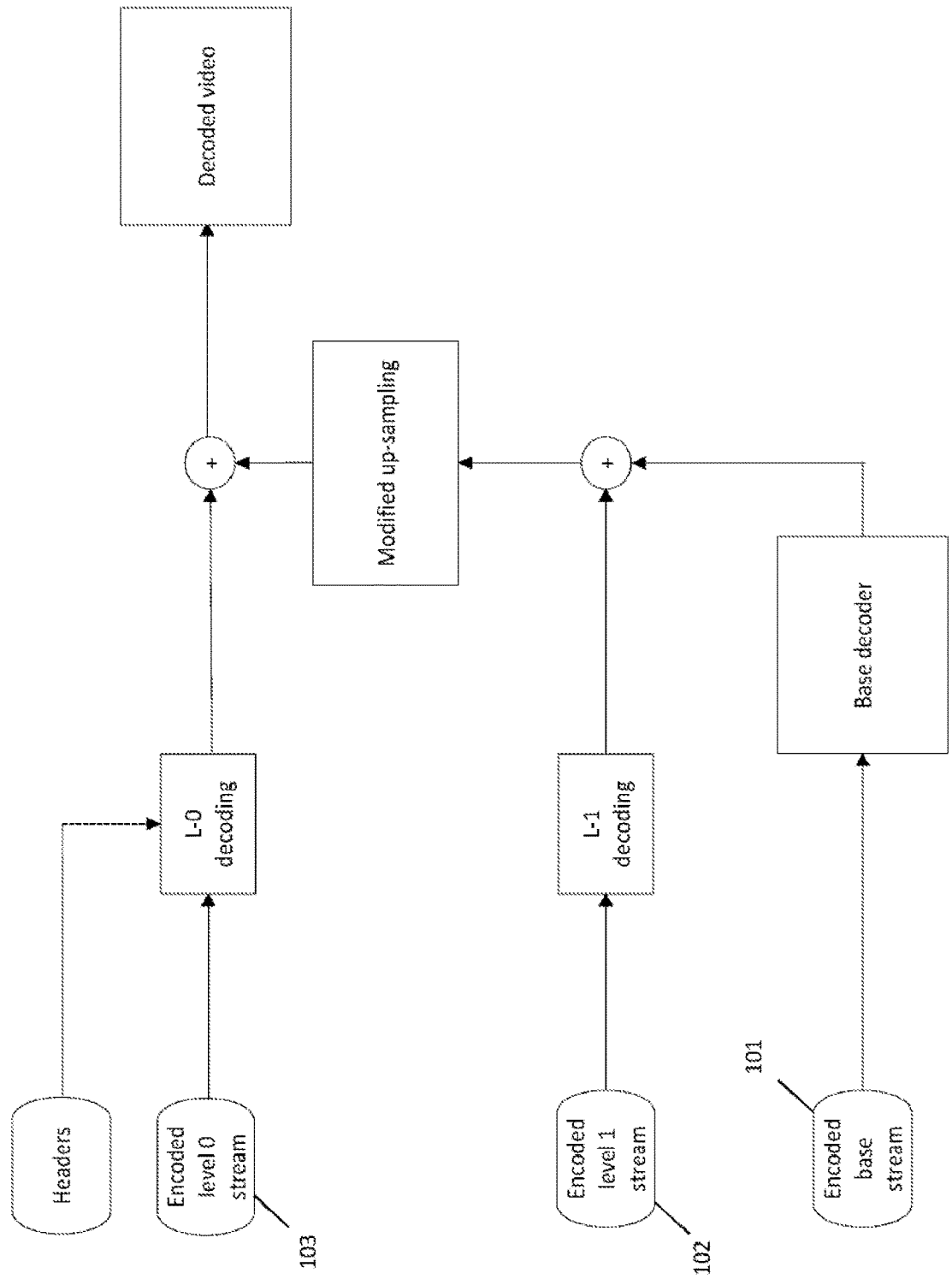
FIG. 2 shows a high-level schematic of a decoding process.

A corresponding generalised decoding process is depicted in the block diagram of FIG. 2. The decoder receives the three streams 101, 102, 103 generated by the encoder together with headers containing further decoding information. The encoded base stream is decoded by a base decoder corresponding to the base codec used in the encoder, and its output is combined with the decoded residuals obtained from the encoded level 1 stream. The combined video is up-sampled and further combined with the decoded residuals obtained from the encoded level 0 stream.

In the decoding process, the decoder may parse the headers (global config, picture config, data block) and configure the decoder based on those headers. In order to re-create the input video, the decoder may decode each of the base stream, the first enhancement stream and the further enhancement stream. The frames of the stream may be synchronised and then combined to derive the decoded video.

In each of FIGS. 1 and 2, the level 0 and level 1 encoding operations may include the steps of transformation, quantization and entropy encoding. Similarly, at the decoding stage, the residuals may be passed through an entropy decoder, a de-quantizer and an inverse transform module. Any suitable encoding and corresponding decoding operation may be used. Preferably however, the level 0 and level 1 encoding steps may be performed in software.

In summary, the methods and apparatuses herein are based on an overall algorithm which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding algorithm. The idea behind the overall algorithm is to hierarchically encode/decode the video frame as opposed to the use block-based approaches as used in the MPEG family of algorithms. Hierarchically encoding a frame includes generating residuals for the full frame, and then a decimated frame and so on.

The video compression residual data for the full-sized video frame may be referred to as LoQ-0 (e.g. 1920×1080 for an HD video frame), while that of the decimated frame may be referred to as LoQ-x, where x denotes the number of hierarchical decimations. In the described examples of FIGS. 1 and 2, the variable x has a maximum value of 1 and hence there are 2 hierarchical levels for which compression residuals will be generated.

Figure 3:
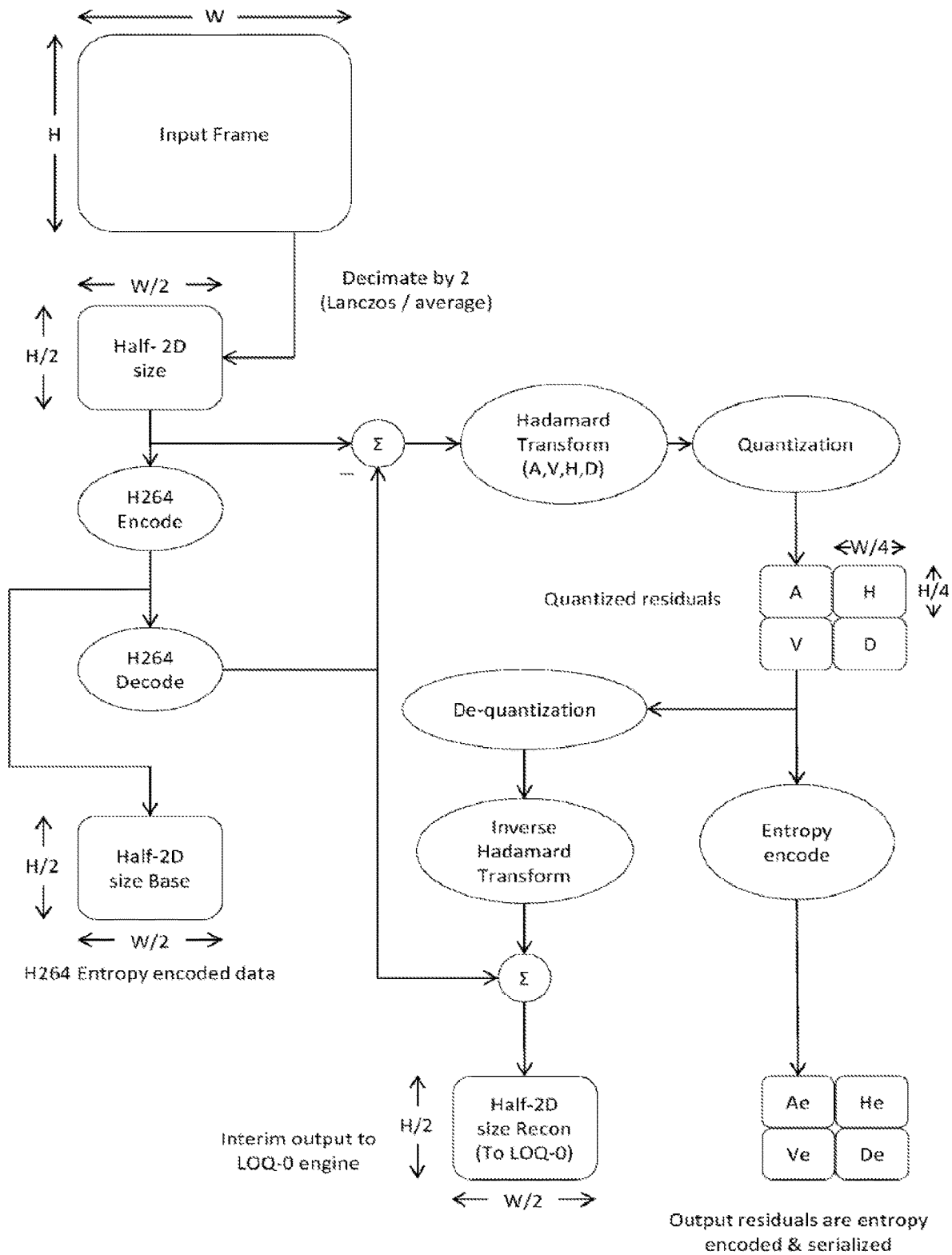
FIG. 3 shows a high-level schematic of a process of creating residual data.

FIG. 3 illustrates an example of how LoQ-1 could be generated at an encoding device. In the present figure the overall algorithm and methods are described using an AVC/H.264 encoding/decoding algorithm as baseline algorithm, but it is understood that other encoding/decoding algorithms can be used as baseline algorithms without any impact to the way the overall algorithm works.

It will of course be understood that the blocks of FIG. 3 are merely examples of how the broad concepts could be implemented.

The diagram of FIG. 3 shows the process of generating entropy encoded residual data for the LoQ-1 hierarchy level. In the example, the first step is to decimate the incoming uncompressed video by a factor of 2. This decimated frame is then passed through a base coding algorithm (in this case, an AVC/H.264 coding algorithm) where an entropy encoded reference frame is then generated and stored. A decoded version of the encoded reference frame is then generated, and the difference between the decoded reference frame and the decimated frame (LoQ-1 residuals) will form the input to the transform block.

The transform (e.g., a Hadamard-based transform in this illustrated example) converts this difference into 4 components (or planes), namely A (average), H (horizontal), V (vertical) and D (diagonal). These components are then quantized via the use of variables called 'step-widths' (e.g. a residual value may be divided by the step-width and the nearest integer value selected). A suitable entropy encoding process is the subject of this disclosure and described in detail below. These quantized residuals are then entropy encoded in order to remove any redundant information. The quantized encoded coefficients or components (Ae, He, Ve and De) are then placed within a serial stream with definition packets inserted at the start of the stream, this final stage is accomplished using a file serialization routine. Packet data may include such information such as the specification of the encoder, type of up-sampling to be employed, whether or not A and D planes are discarded, and other information to enable a decoder to decode the streams.

Both the reference data (half-sized baseline entropy encoded frame) and the entropy encoded LoQ-1 residual data may be buffered, transmitted or stored away for use by the decoder during the reconstruction process.

In order to produce LoQ-0 residual data, the quantized output is branched off and reverse quantization and transform processes are performed on it in order to reconstruct the LoQ-1 residuals, which are then added to the decoded reference data (encoded & decoded) in order to get back a video frame closely resembling the originally decimated input frame.

This process ideally mimics the decoding process and hence the originally decimated frame is not used.

Figure 4:
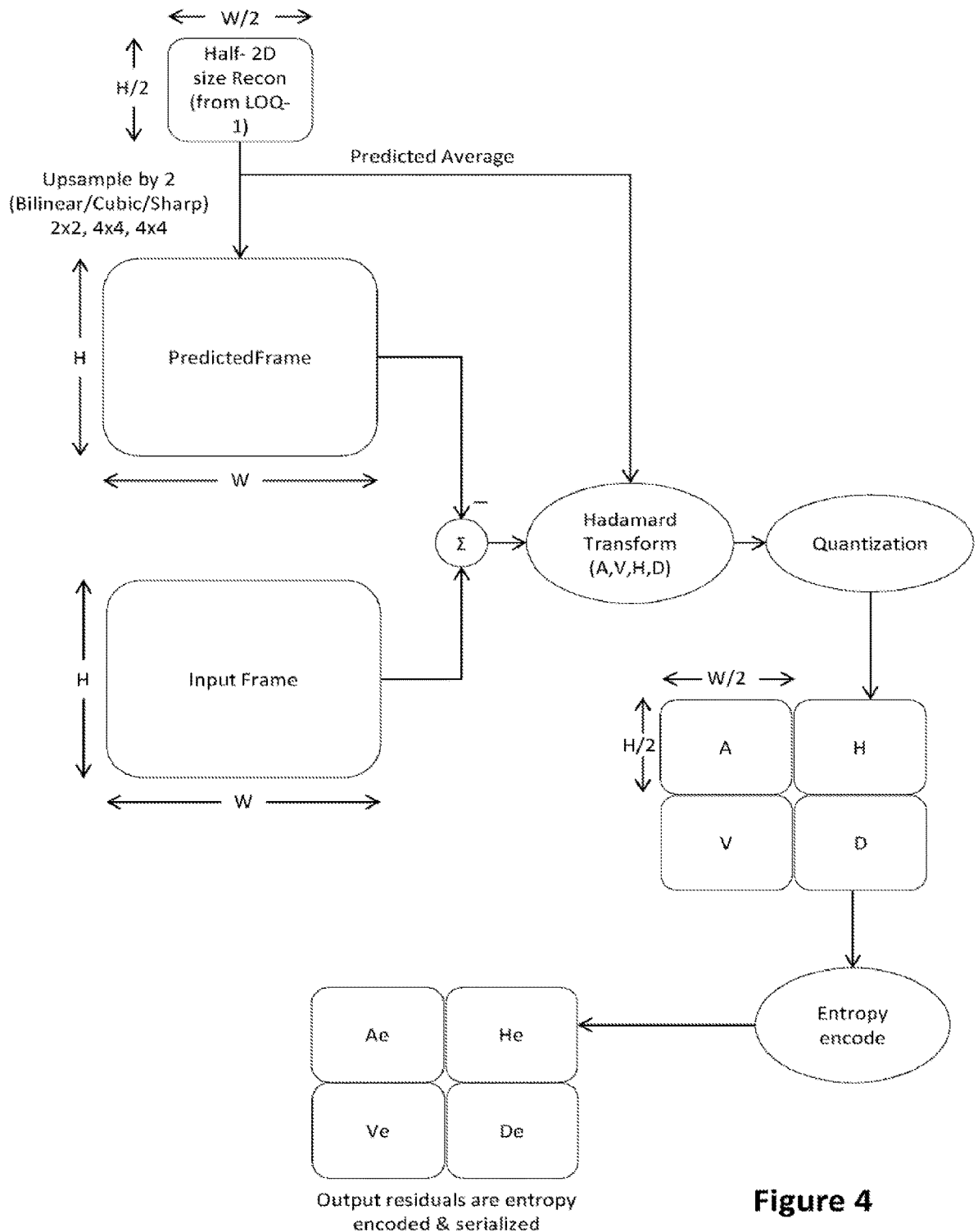
FIG. 4 shows a high-level schematic of a process of creating further residual data at a different level of quality.

FIG. 4 illustrates an example of how LoQ-0 could be generated at an encoding device. In order to derive the LoQ-0 residuals, the reconstructed LoQ-1 sized frame is derived as described in the previous section.

The next step is to perform an up-sampling of the reconstructed frame to full size (by 2). At this point various algorithms may be used to enhance the up-sampling process such as nearest, bilinear, sharp or cubic algorithms. This reconstructed full-size frame termed 'predicted' frame is then subtracted from the original uncompressed video input which creates some residuals (LoQ-1 residuals).

Similar to the LoQ-1 process, the difference is then transformed, quantized, entropy encoded and file serialized which then forms the third and final data. This may be buffered, transmitted or stored away for later use by the decoder. As it can be seen, a component called "predicted average" (described below) can be derived using the upsampling process, and used in place of the A (average) component to further improve the efficiency of the coding algorithm.

Figure 5:
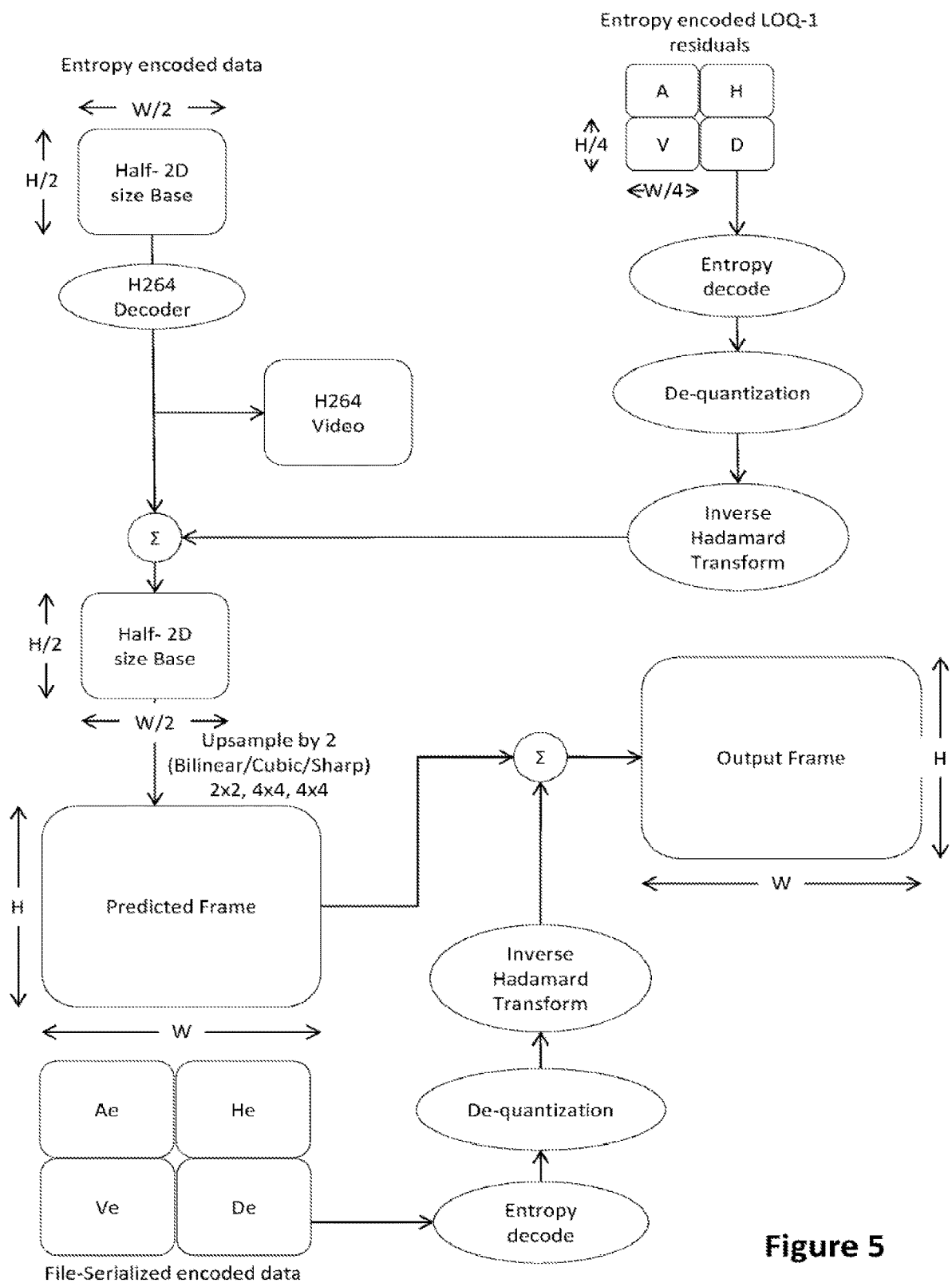
FIG. 5 shows a high-level schematic of a process of reconstructing a frame from residual data.

FIG. 5 shows schematically how the decoding process could be performed in a particular example. The entropy encoded data, the LOQ-1 entropy encoded residual data and the LOQ-0 entropy encoded residual data (for example as file-serialized encoded data). The entropy encoded data include the reduced-size (e.g., half-size, i.e. with dimensions W/2 and H/2 with respect to the full frame having dimensions W and H) encoded base.

The entropy encoded data are then decoded using the decoding algorithm corresponding to the algorithm which has been used to encode those data (in the example, an AVC/H.264 decoding algorithm). At the end of this step, a decoded video frame, having a reduced-size (e.g., half-size) is produced (indicated in the present example as an AVC/H.264 video).

In parallel, the LoQ-1 entropy encoded residual data are decoded. As discussed above, the LoQ-1 residuals are encoded using four coefficients or components (A, V, H and D) which, as shown in this Figure, have a dimension of one quarter of the full frame dimension, namely W/4 and H/4. This is because, as discussed in previous patent application U.S. Ser. No. 13/893,669 and PCT/EP2013/059847, the contents of which are incorporated herein by reference, the four components contain all the information relative to the residuals and are generated by applying a 2×2 transform kernel to the residuals whose dimension, for LoQ-1, would be W/2 and H/2, i.e., the same dimension of the reduced-size entropy encoded data. The four components are entropy decoded, then de-quantized and finally transformed back into the original LoQ-1 residuals by using an inverse transform (in this case, a 2×2 Hadamard inverse transform).

The decoded LoQ-1 residuals are then added to the decoded video frame to produce a reconstructed video frame at reduced-size (in this case, half-size), identified as Half-2D size reconstruction.

This reconstructed video frame is then up-sampled to bring it up to full resolution (so, in this example, from half width (W/2) and half height (H/2) to full width (W) and full height (H)) using an up-sampling filter such as bilinear, bicubic, sharp, etc. The up-sampled reconstructed video frame will be a predicted frame (full-size, W×H) to which the LoQ-0 decoded residuals are then added.

In particular, the LoQ-0 encoded residual data are decoded. As discussed above, the LoQ-0 residuals are encoded using four coefficients or components (A, V, H and D) which, as shown in this figure, have a dimension of half the full frame dimension, namely W/2 and H/2. This is because, as discussed in previous patent application U.S. Ser. No. 13/893,669 and PCT/EP2013/059847, the contents of which are incorporated herein by reference, the four components contain all the information relative to the residuals and are generated by applying a 2×2 transform kernel to the residuals whose dimension, for LoQ-0, would be W and H, i.e., the same dimension of the full frame. The four components are entropy decoded (see process below), then de-quantized and finally transformed back into the original LoQ-0 residuals by using an inverse transform (in this case, a 2×2 Hadamard inverse transform).

The decoded LoQ-0 residuals are then added to the predicted frame to produce a reconstructed full video frame—the output frame.

Figure 6:
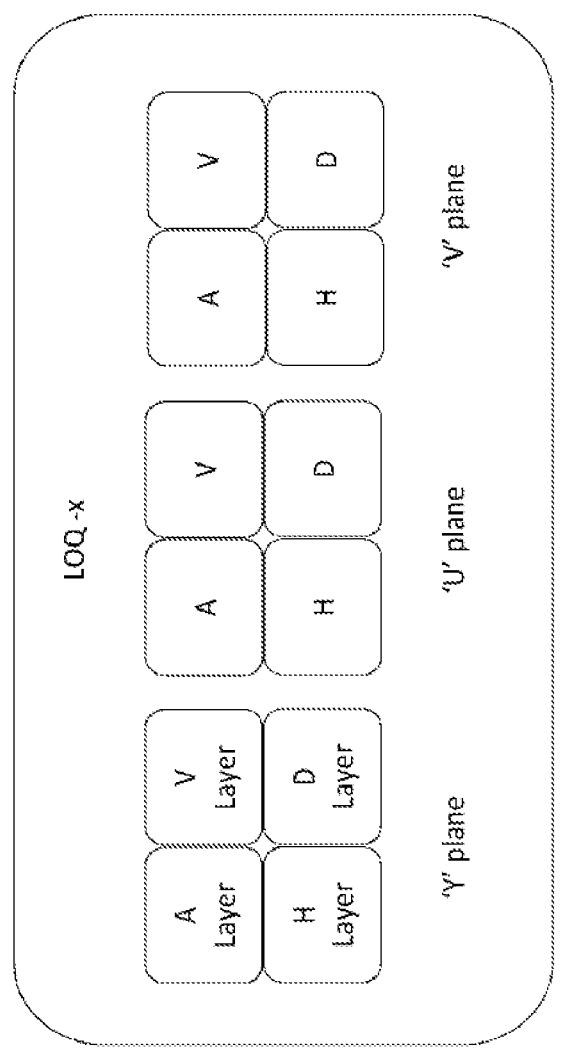
FIG. 6 shows a hierarchical data structure.

The data structure is represented in an exemplary manner in FIG. 6. As discussed, the above description has been made with reference to specific sizes and baseline algorithms, but the above methods apply to other sizes and or baseline algorithms, and the above description is only given by way of example of the more general concepts described.

In the encoding/decoding algorithm described above, there are typically 3 planes (e.g., YUV or RGB), with two level of qualities LoQs which are described as LoQ-0 (or top level, full resolution) and LoQ-1 (or lower level, reduced-size resolution such as half resolution) in every plane. Each plane may represent a different colour component for a video signal.

Every LoQ contains four components or layers, namely A, H, V and D. This gives a total of 3×2×4=24 surfaces of which 12 are full size (e.g., W×H) and 12 are reduced-size (e.g., W/2×H/2). Each layer may comprise coefficient values for a particular one of the components, e.g. layer A may comprise a top-left A coefficient value for every 2×2 block of the input image or frame.

Figure 7:
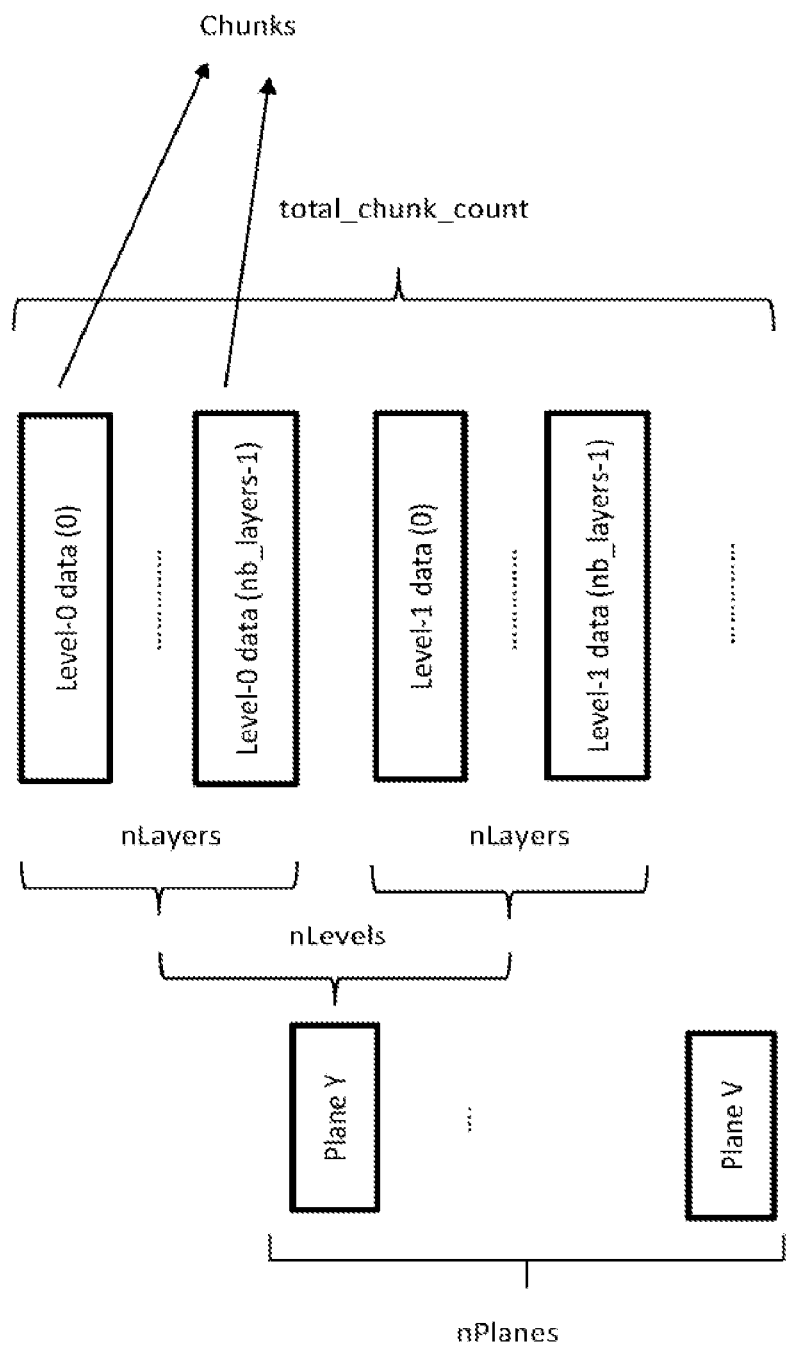
FIG. 7 shows a further hierarchical data structure.

FIG. 7 illustrates an alternative view of a proposed hierarchical data structure. The encoded data may be separated into chunks. Each payload may be ordered hierarchically into chunks. That is, each payload is grouped into planes, then within each plane each level is grouped into layers and each layer comprises a set of chunks for that layer. Level represents each level of enhancement (first or further) and layer represents a set of transform coefficients.

The method may comprise retrieving chunks for two levels of enhancement for each plane. The method may comprise retrieving 16 layers for each level (e.g. if a 4×4 transform is used). Thus, each payload is ordered into a set of chunks for all layers in each level and then the set of chunks for all layers in the next level of the plane. Then the payload comprises the set of chunks for the layers of the first level of the next plane and so on.

Thus, the method may decode headers and output entropy encoded coefficients grouped by plane, levels and layers belonging to the picture enhancement being decoded. Thus, the output may be (nPlanes)×(nLevel)×(nLayer) array surfaces with elements surfaces[nPlanes][nLevel][nLayer].

Note that the entropy coding techniques provided herein may be performed on each group, that is, may be performed per surface, per plane, per level (LoQ), or per layer. Note that the entropy coding may be performed on any residual data and not necessarily quantised and/or transformed coefficients.

As shown FIGS. 4 and 5, the proposed encoding and decoding operations include an entropy coding stage or operation. It is proposed in the following that the entropy coding operation comprises one or more of a run length coding component (RLE) and a Huffman coding component. These two components may interrelate to provide additional benefits.

Figure 8:
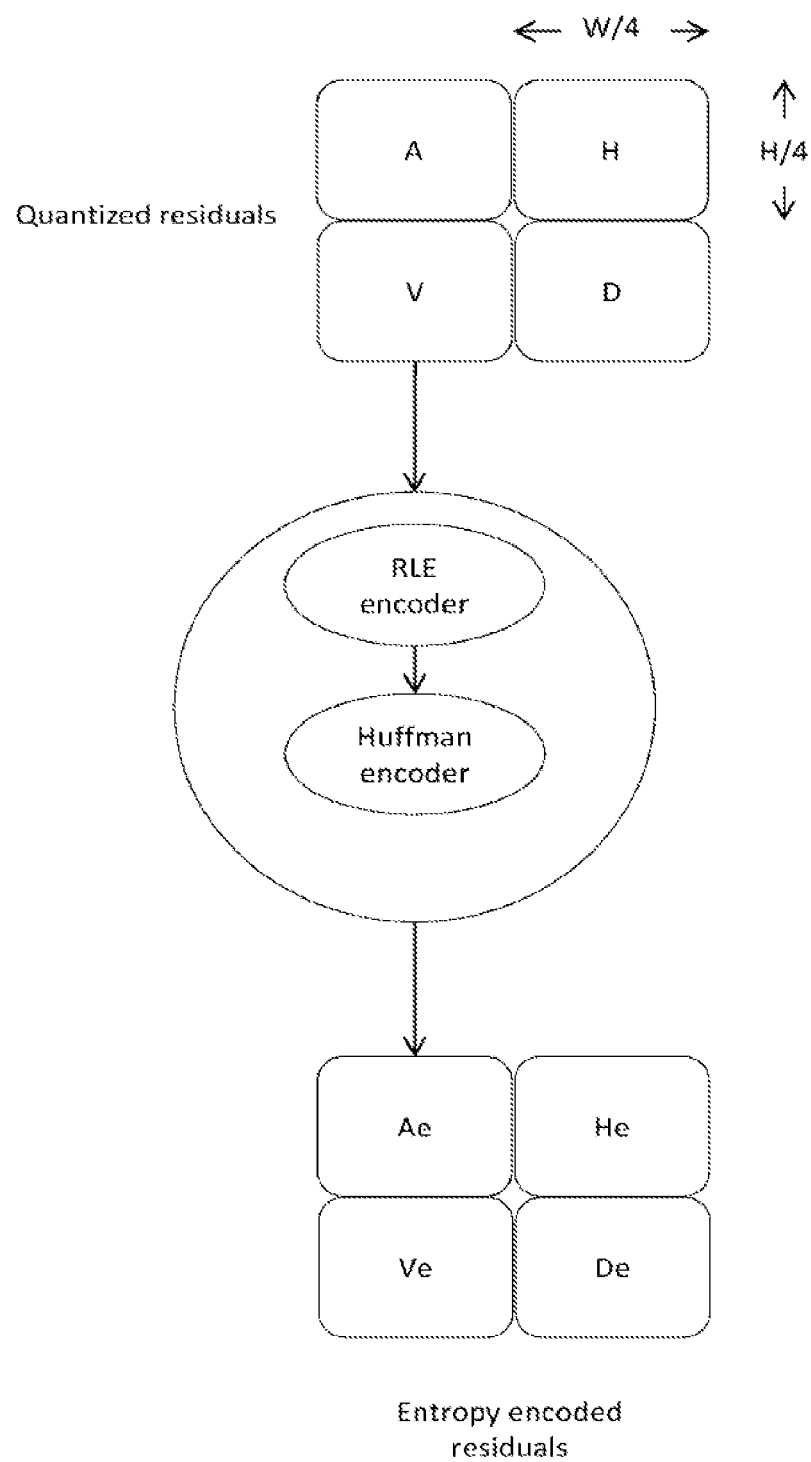
FIG. 8 shows an example encoding process.
Figure 9:
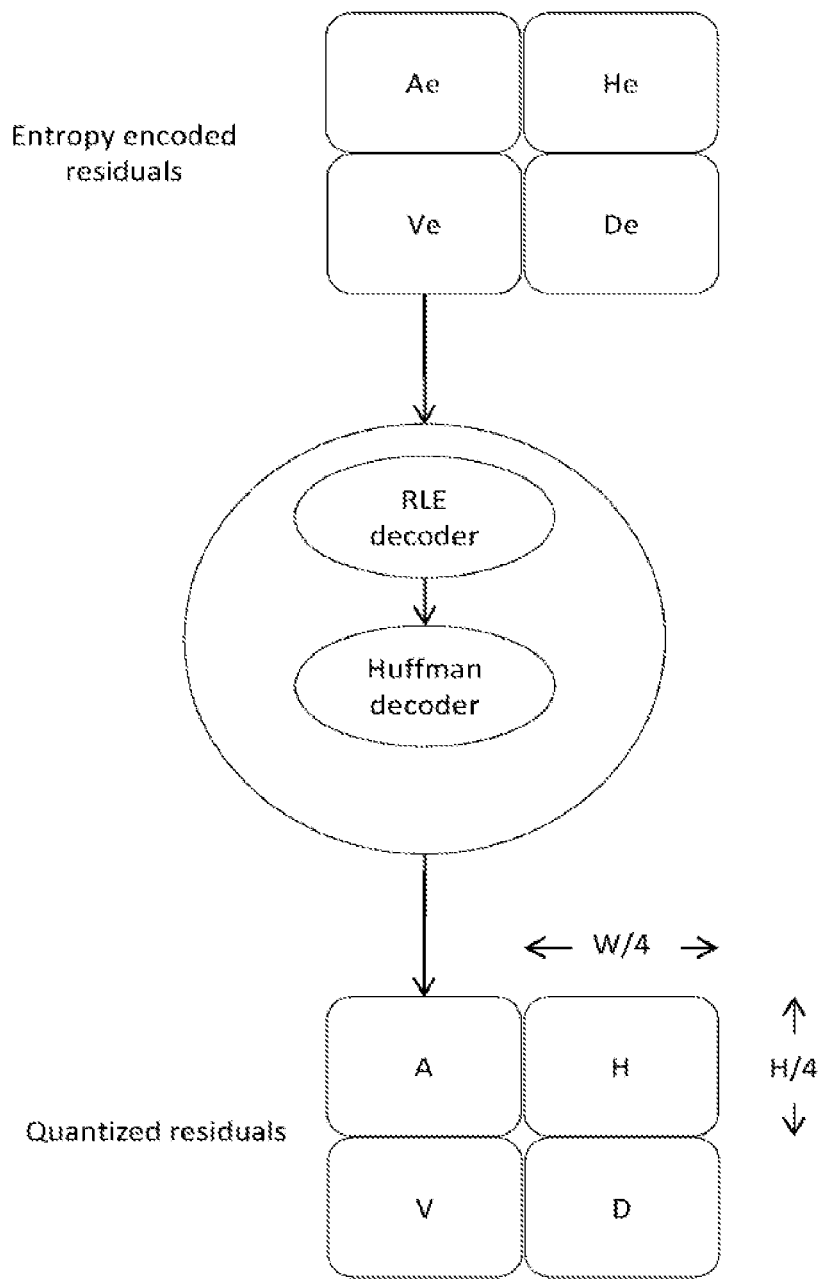
FIG. 9 shows an example decoding process.

As noted and as illustrated in FIG. 8, the input of the entropy encoder is a surface (e.g. residual data derived from a quantized set of residuals as illustrated in this example) and the output of the process is an entropy encoded version of the residuals (Ae, He, Ve, De). However as above, it should be noted that the entropy coding may be performed on any residual data and not necessarily quantised and/or transformed coefficients. FIG. 9 illustrates a corresponding high-level decoder with inverse inputs and outputs. That is, the entropy decoder takes as inputs entropy encoded residuals (Ae, He, Ve, De) and outputs residual data (e.g. quantised residuals in this illustrated example).

Note that FIG. 8 generally introduces RLE decoding before Huffman decoding but as will be clear throughout the present application such an order is not-limiting and the stages may be interchangeable, interrelated or in any order.

Similarly, we note that run-length coding may be provided without Huffman coding and in comparative cases run-length coding and Huffman coding may not be performed (either replaced by alternative lossless entropy coding or no entropy coding performed at all). For example, in a production example with a reduced emphasis on data compression, an encoding pipeline may not comprise entropy coding but the benefits of residuals may lie in layered storage for distribution.

A comparative run-length encoder (RLE) may compress data by encoding sequences of the same data value as a single data value and a count of that data value. For example, the sequence 555500022 may be encoded as (4,5)(3,0)(2,2). That is, there is a run of four 5s, a run of three 0s followed by a run of two 2s.

To encode the residual data there is proposed a modified RLE coding operation. To take advantage of the structure of the residual data, it is proposed to encode only runs of zeros. That is, each value is sent as a value with each zero is sent as a run of zeros. The modified RLE coding operations described herein may be used, for example, to provide entropy encoding and/or decoding in one or more LoQ layers, e.g. as shown in FIGS. 1 to 5.

Thus, the entropy coding operation comprises parsing the residual data and encoding zero values as a run of consecutive zeros.

As noted above, to provide an additional level of data compression (which may be lossless), the entropy coding operation further applies a Huffman coding operation to the run-length coded data.

Huffman coding and run-length coding have been previously paired together, in for example facsimile coding (e.g. ITU Recommendations T.4 and T.45) and the JPEG File Interchange Format, but have been superseded over the last 30 years. The present description proposes techniques and methods to implement Huffman coding in combination with RLE coding, techniques and methods to efficiently exchange data and metadata between an encoder and decoder, and techniques and methods to reduce the overall data size of such a combination when used to code residual data.

A Huffman code is an optimal prefix code which is used for data compression (e.g. lossless compression). A prefix code is a code system for which there is no code work in the system that is the prefix of any other code. That is, a Huffman coding operation takes a set of input symbols and converts each input symbol into a corresponding code. The code chosen is based on the frequency of which each symbol appears in the original data set. In this way, smaller codes can be associated with symbols which occur more frequently so as to reduce the overall size of the data.

To facilitate Huffman coding, the input data is preferably structured as symbols. The output of the run-length coding operation is preferably structured to be a stream of bytes of encoded data.

In one example, the run-length coding operation outputs two types of bytes or symbols. A first type of symbol is a value of a non-zero pixel and a second type of symbol is a run of consecutive zero values. That is, an amount of zero values that occur consecutively in the original data set.

In a further example, to encode certain data values, two bytes or symbols may be combined. That is, for example, where a pixel value is larger than a threshold value, two bytes or symbols may be used to encode the data value in a symbol. These two symbols can be combined at the decoder to recreate the original data value of the pixel.

Each symbol or byte may include 6 or 7 bits of data and one or more flags or bits indicating the type of symbol.

In an implementation example, the run-length coded data may be encoded efficiently by inserting, in each symbol, one or more flags indicating the next symbol to be expected in the stream of bytes.

To facilitate synchronisation between the encoder and decoder, the first byte of the stream of run-length coded data may be a data value type of symbol. This byte may then indicate the next type of byte that has been encoded.

In certain embodiments, the flag indicating the next byte may be different depending on the type of symbol. For example, the flag or bit may be located at the beginning or the end of the byte or both. For example, at the beginning of byte, the bit may indicate that the next symbol may be a run of zeros. At the end of the byte, the bite may be an overflow bit, indicating that the next symbol contains a part of the data value to be combined with the data value in the current symbol.

The following describes a specific implementation example of a run-length coding operation. The RLE has three contexts: RLC_RESIDUAL_LSB, RLC_RESIDUAL_MSB and RLC_ZERO_RUN. The structure of these bytes is illustrated in FIGS. 10, 11 and 12.

Figure 10:
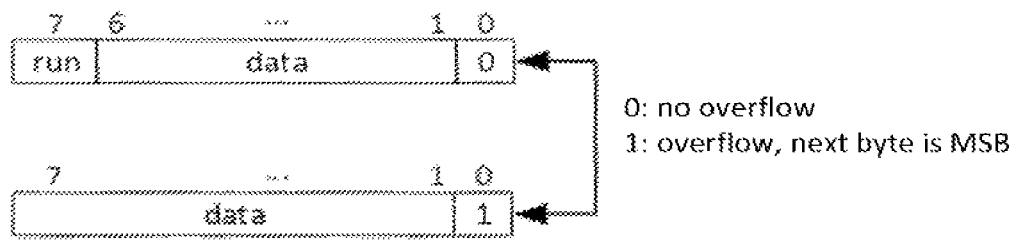
FIG. 10 shows a structure of a first data symbol.

In a first type of symbol, RLC_RESIDUAL_LSB, illustrated in FIG. 10, the 6 least significant bits of a non-zero pixel are encoded. A run bit may be provided that indicates that the next byte is encoding the count of a run of zeros. An overflow bit may be set if the pixel value does not fit within 6 bits of data. When the overflow bit is set, the context of the next byte will be an RLC_RESIDUAL_MSB type. That is, the next symbol will comprise a data byte which can be combined with the bits of the current symbol to encode a data value. Where the overflow bit is set, the next context cannot be a run of zeros and therefore the symbol can be used to encode data.

FIG. 10 indicates an example of this type of symbol. If the data value to be encoded is greater than a threshold value of 64, or the pixel value does not fit within 6 bits of data, the overflow bit may be set by the encoding process. If an overflow bit is set as the least significant bit of the byte then the remaining bits of the byte may encode data. If the pixel value fits within 6 bits, the overflow bit may not be set and a run bit may be included that indicates whether or not the next symbol is a data value or a run of zeros.

Figure 11:
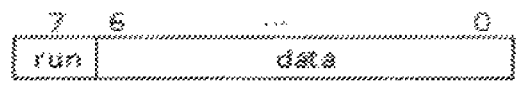
FIG. 11 shows a structure of a second data symbol.
Figure 12:
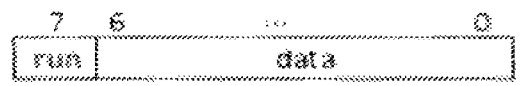
FIG. 12 shows a structure of a run symbol.

A second type of symbol, RLC_RESIDUAL_MSB, illustrated in FIG. 11, encodes bits 7 to 13 of pixel values that do not fit within 6 bits of data. Bit 7 of this type of symbol encodes whether or not the next byte is a run of zeros.

A third type of symbol, RLC_ZERO_RUN, illustrated in FIG. 12, encodes 7 bits of a zero run count. That is, the symbol comprises the number of consecutive zeros in the residual data. The run bit of the symbol is high if more bits are needed to encode the count. The run bit may be the most significant bit of the byte. That is, where there are a number of consecutive zeros that requires more than the 7 bits available, 178 or 255 say, the run bit indicates that the next bit will indicate a further run of zeros.

Optionally, the additional symbol may comprise a second run of zeros which can be combined with the first run or may comprise a set of bits of a value which can be combined with the bits of the first symbol at the decoder to indicate the count.

As indicated above, in order for the decoder to start on a known context, the first symbol in the encoded stream may be a residual data value type of symbol, that is, may be a RLC_RESIDUAL_LSB type.

In a specific example, the RLE data may be organised in blocks. Each block may have an output capacity of 4096 bytes. The RLE may switch to a new block in the following cases:

the current block is full;

the current RLE data is a run and there is less than 5 bytes left in the current block; and/or the current RLE data is lead to an LSB/MSB pair and there is less than 2 bytes left in the current block.

In summary, a run-length coding operation may be performed on the residual data of the new coding technology that comprises encoding into a stream a set of data values and a count of consecutive zero values. In a specific implementation, the output of the run-length coding operation may be a stream of bytes or symbols, where each byte is one of three types or contexts. The byte indicates the next type of byte to be expected in the stream of bytes.

It should be noted that these structures are provided as an example, and that different bit encoding schemes may be applied while following the functional teachings described herein. For example, the encoding of the least and most significant bits may be exchanged and/or different bit lengths may be enacted. Also, flag bits may be located at different predefined positions within a byte.

As indicated above, a Huffman coding operation may be applied to the stream of bytes to further reduce the size of the data. The process may create a frequency table of the relative occurrence of each symbol in the stream. From the frequency table, the process may generate a Huffman tree. A Huffman code for each symbol may be generated by traversing the tree from the root until the symbol is reached, assigning a bit of the code for each branch taken.

In a preferred implementation for use with the specifics of the run-length coded symbols of the quantized residuals (i.e. the residual data), a canonical Huffman coding operation may be applied. Canonical Huffman codes may reduce the storage requirements of a set of codes depending on the structure of the input data. A canonical Huffman procedure provides a way to generate a code that implicitly contains the information of which codeword applies to which symbol. The Huffman codes may be set with a set of conditions, for example, all codes of a given length may have lexicographically consecutive values in the same order as the symbols they represent and shorter codes lexicographically precede longer codes. In a canonical Huffman coding implementation, only the codewords and the lengths of each code need to be transmitted for the decoder to be able to replicate each symbol.

After the canonical Huffman coding operation is applied, the data size of the output data may be compared to the size of the data after the run-length coding operation. If the data size is smaller, then the smaller data may be transmitted or stored. The comparison of data size may be performed based on the size of a data block, a size of a layer, plane or surface or the overall size of the frame or video. To signal to the decoder how the data was encoded, a flag may be transmitted in a header of the data that the data is coded using Huffman coding, RLE coding or both. In an alternative implementation, the decoder may be able to identify from characteristics of the data that the data has been encoded using a particular coding operation. For example, as indicated below, the data may be split into a header and data part where canonical Huffman coding is used so as to signal the code lengths of encoded symbols.

The canonical Huffman encoded data comprises a part that signals to the decoder the lengths of the code used for each symbol and a part that comprises a stream of bits representing the encoded data. In a specific implementation proposed herein, the code lengths may be signalled in a header part and the data signalled in a data part. Preferably a header part will be signalled for each surface but may be signalled for each block or other sub-division depending on the configuration.

In a proposed example, the header may be different depending on the amount of non-zero codes to be encoded. The amount of non-zero codes to be encoded (for each surface or block for example) may be compared to a threshold value and a header used based on the comparison. For example, where there are more than 31 non-zero codes, the header may sequentially indicate all symbols, starting for a predetermined signal such as 0. In order, the length of each symbol may be signalled. Where there are fewer than 31 non-zero codes, each symbol value may be signalled in the header with a corresponding code length for that symbol.

FIGS. 13 to 16 illustrate a specific implementation of the header formats and ow the code lengths may be written to a stream header depending on the amount of non-zero codes.

FIG. 13 illustrates a situation where there may be more than 31 non-zero values in the data. The header includes a minimum code length and a maximum code length. The code length for each symbol is sent sequentially. A flag indicates that the length of the symbol is non-zero. The bits of the code length are then sent as a difference between the code length and the minimum signalled length. This reduces the overall size of the header.

FIG. 14 illustrates a header similar to FIG. 13 but used where there is are fewer than 31 non-zero codes. The header further includes the number of symbols in the data, followed by a symbol value and the length of the codeword for that symbol, again sent as a difference.

Figure 15:
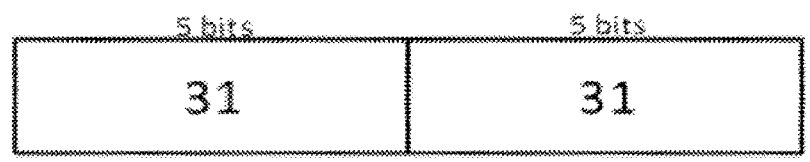
FIG. 15 shows a structure of a third stream header.
Figure 16:
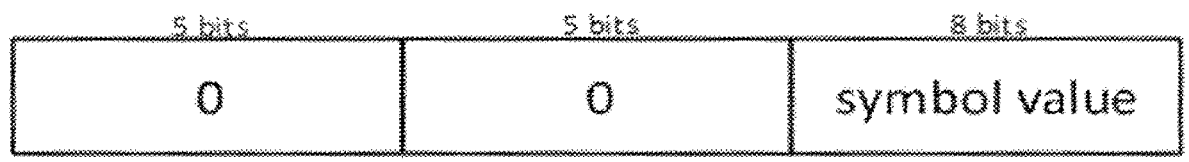
FIG. 16 shows a structure of a fourth stream header.

FIGS. 15 and 16 illustrate further headers to be sent in outlying cases. For example, where the frequencies are all zero, the stream header may be as illustrated in FIG. 14 indicating two values of 31 in the minimum and maximum length fields to indicate a special situation. Where there is only one code in the Huffman tree, the stream header may be as indicated in FIG. 16 using a 0 value in the minimum and maximum length fields to indicate a special situation and then followed by the symbol value to be used.

In this latter example, where there is only one symbol value, this may indicate that there is only one data value in the residual data.

The encoding process can thus be summarised as follows—

Parse residual data to identify data values and consecutive counts of zero values.

Generate a set of symbols where each symbol is a byte and each byte comprises either a data value or a run of zeros as well as an indication of the next symbol in the set of symbols. The symbols may include an overflow bit indicating that the next symbol includes a part of the data value included in the current symbol or a run bit indicating the next symbol is a run of zeros.

Convert each fixed-length symbol into a variable code using canonical Huffman coding. Canonical Huffman coding parses the symbols to identify the frequency with which each symbol occurs in the set of symbols and assigns a code to the symbol based on the frequency and the value of the symbol (for identical code lengths).

Generate and output a set of code lengths, each associated with a symbol. The code lengths being the length of each code assigned to each symbol.

Combine the variable-length codes into a bitstream.
Output the encoded bitstream.

In the specific implementation described, it is noted that the maximum code length depends on the number of symbols encoded and the number of samples used to derive the Huffman frequency table. For N symbols the maximum code length is N−1. However, in order for a symbol to have a k-bit Huffman code, the number of samples used to derive the frequency table needs to be at least:

$$S_k = \sum_{i=0}^{k+1} F_i$$

where $F_i$ is the $i^{th}$ Fibonacci number.

For example, 8-bit symbols, the theoretical maximum code length is 255. However, for an HD 1080p video, the maximum number of samples used to derive the frequency table for an RLE context of a residual is 1920*1080/4=518 400, which is between S26 and S27. Hence no symbol can have a Huffman code greater than 26 bits for this example. For 4K this number increases to 29 bits.

For completeness, using FIG. 17, we provide an example of Huffman encoding of a set of symbols, in this example the symbols are alphanumeric. As noted above, a Huffman Code is an optimal prefix code which may be used for lossless data compression. A prefix code is a code system for which there is no code word in the system that is the prefix of any other code.

In order to find a Huffman Code for a given set of symbols a Huffman tree needs to be created. First the symbols are sorted by frequency, for example:

| Symbol | Frequency |
|---|---|
| A | 3 |
| B | 8 |
| C | 10 |
| D | 15 |
| E | 20 |
| F | 43 |

Figure 17A:
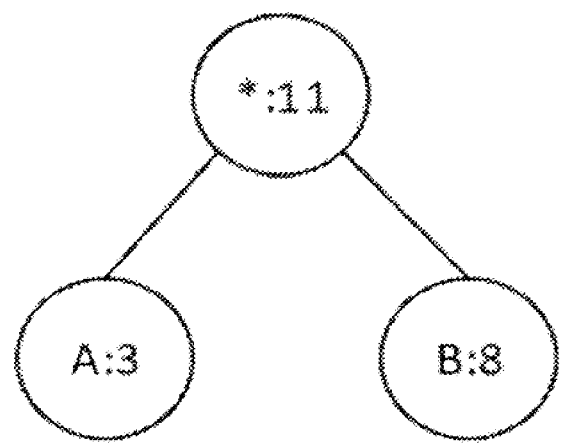
FIGS. 17A-17E show Huffman trees.

The two lowest elements are removed from the list and made into leaves, with a parent node that has a frequency the sum of the two lower element's frequencies. The partial tree is illustrated in FIG. 17a.

The new sorted frequency list is:

| Symbol | Frequency |
|---|---|
| C | 10 |
| * | 11 |
| D | 15 |
| E | 20 |
| F | 43 |

Figure 17B:
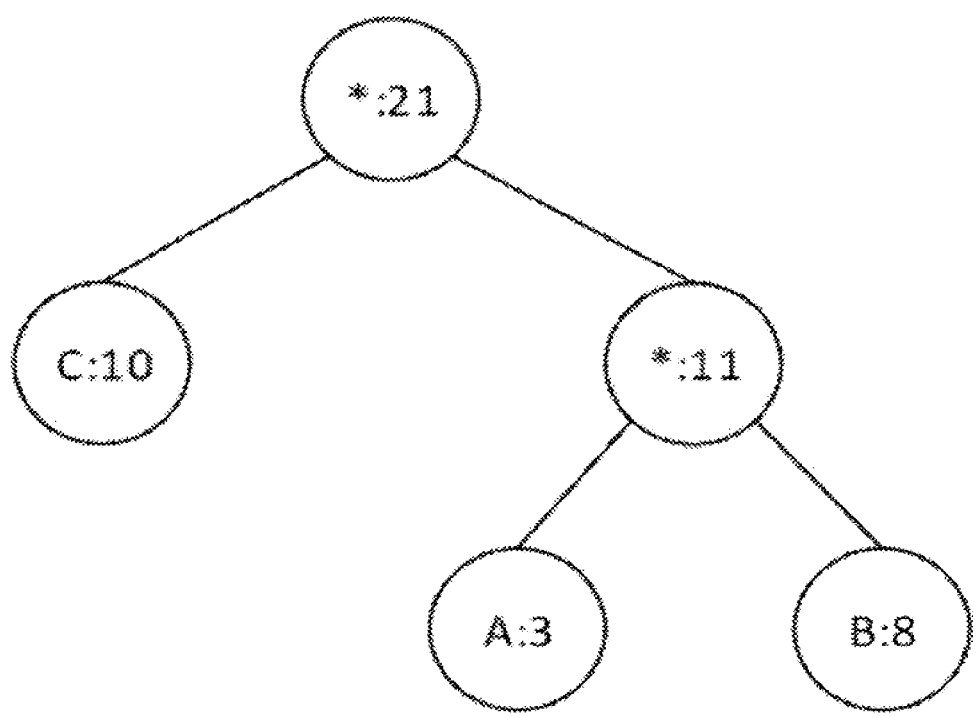

Then the loop is repeated, combining the two lowest elements as illustrated in FIG. 17b.

The new list is:

| Symbol | Frequency |
|---|---|
| D | 15 |
| E | 20 |

| Symbol | Frequency |
|---|---|
| * | 21 |
| F | 43 |

Figure 17C:
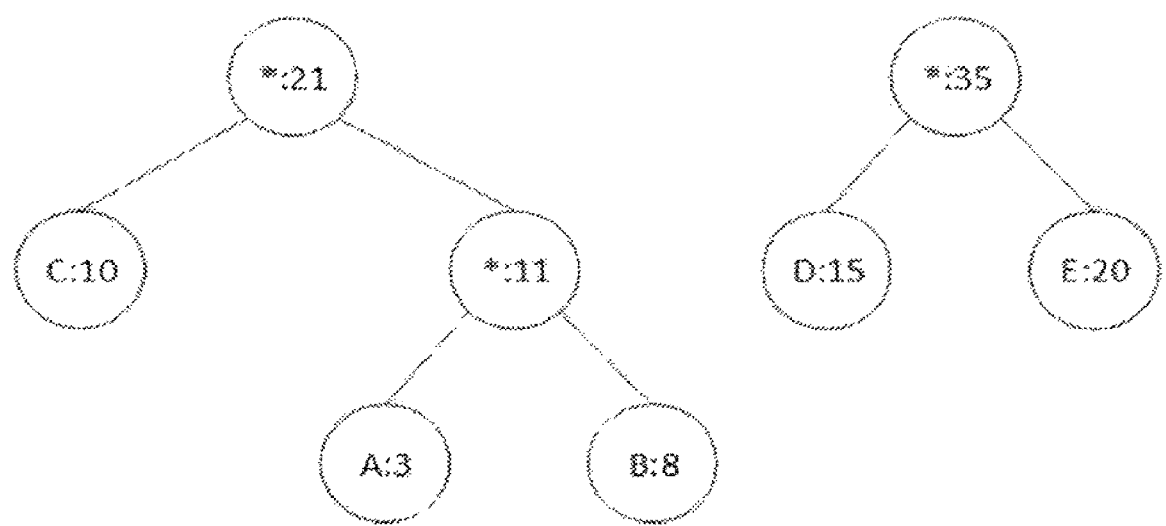
Figure 17D:
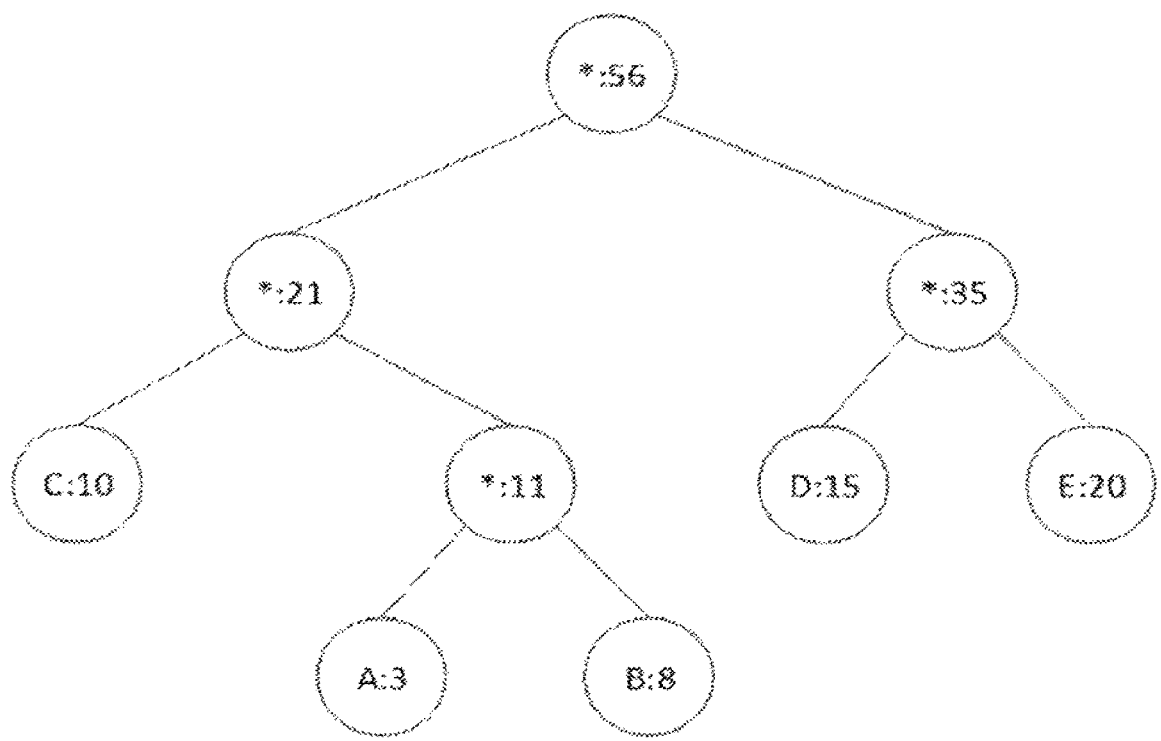
Figure 17E:
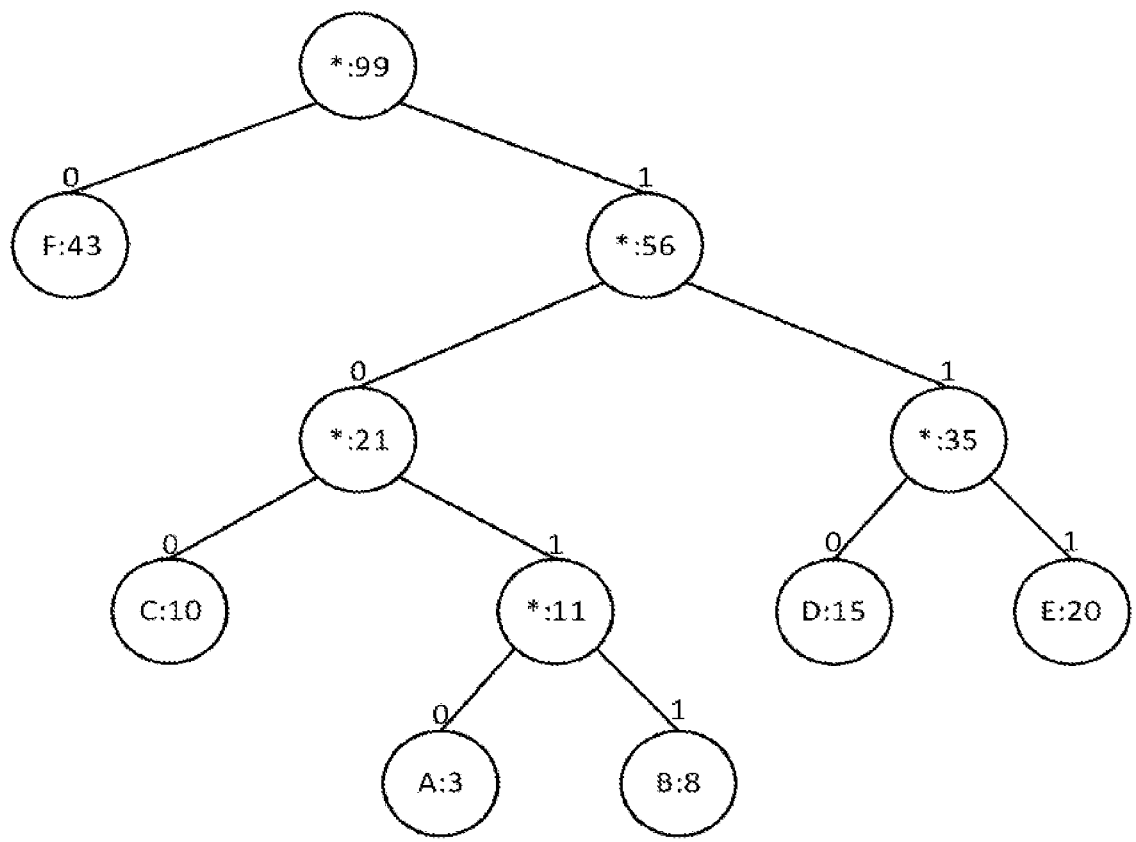

This is repeated until only one element remains in the list as illustrated in FIGS. 17c, 17d, 17e and the following corresponding tables.

| Symbol | Frequency |
|---|---|
| * | 21 |
| * | 35 |
| F | 43 |

| Symbol | Frequency |
|---|---|
| F | 43 |
| * | 56 |

| Symbol | Frequency |
|---|---|
| * | 99 |

Once the tree is built, to generate the Huffman code for a symbol the three is traversed from the root to this symbol, outputting a 0 each time a left branch is taken and a 1 each time a right branch is taken. In the example above this gives the following code:

| Symbol | Code | Code length |
|---|---|---|
| A | 1010 | 3 |
| B | 1011 | 3 |
| C | 100 | 2 |
| D | 110 | 2 |
| E | 111 | 2 |
| F | 0 | 0 |

The code length of a symbol is the length of its corresponding code.

To decode a Huffman code, the tree is traversed beginning at the root, taking a left path if a 0 is read and a right path if a 1 is read. The symbol is found when hitting a leaf.

As described above, the RLE symbols may be coded using Huffman coding. In a preferred example, canonical Huffman coding is used. In an implementation of canonical Huffman coding, a Huffman coding procedure may be used and the code produced transformed into canonical Huffman codes. That is, the table is rearranged so that identical lengths are sequential in the same order as the symbols they represent and that a later code will always be higher in value than an earlier one. Where the symbols are alphabetical, they may be rearranged in alphabetical order. Where the symbols are values, they may be in sequential value order and the corresponding codewords changed to meet the above constraints. Canonical Huffman coding and/or other Huffman coding approaches described herein may differ from the basic example of FIGS. 17a to 17e.

In the examples described above, a Huffman coding operation may be applied to data symbols coded using a modified run-length coding operation. It is further proposed to create a frequency table for each RLE context or state. For each type of symbol encoded by the RLE coding operation, there may be a different set of Huffman codes. In an implementation, there may be a different Huffman encoder for each RLE context or state.

It is contemplated that one stream header may be sent for each RLE context or type of symbol, that is, a plurality of stream headers may indicate the code lengths for each set of codes, i.e. for each Huffman encoder or each frequency table.

The following describes an example of specific implementation steps of the encoder. In one implementation, encoding the data outputted by the RLE is done in three main steps:

1. Initialise the encoders (e.g. by an InitialiseEncode function):
   a. Initialize each encoder (one per RLE state) with the corresponding frequency table generated by the RLE;
   b. Create the Huffman tree;
   c. Calculate the code length of each symbol; and
   d. Determine the minimum and maximum code lengths.
2. Write code length and code table to the stream header (e.g. by a WriteCodeLengths function) for each encoder:
   a. Assign codes to symbols (e.g. using an AssignCodes function). Note that the function used to assign codes to symbol is slightly different from the example of FIGS. 19a to 19e above, as it makes sure that all codes of a given length are sequential, i.e. uses canonical Huffman encoding;
   b. Write the minimum and maximum code lengths to the stream header; and
   c. Write code lengths of each symbol to the stream.
3. Encode the RLE data:
   a. Set RLE current context to RLC_RESIDUAL_LSB;
   b. Encode the current symbol in the input stream with the encoder corresponding to the current context;
   c. Use the RLE state machine to get next context (see FIG. 20). If this is not last symbol of the stream, goto b; and
   d. If the RLE data is only one block and the encoded stream is bigger than the RLE, store the RLE encoded stream rather than the Huffman encoded stream.

For each RLE block the Huffman encoders create a corresponding Huffman encoded part.

The output of the encoding process described herein is thus either a Huffman encoded bitstream or a run-length encoded bytestream. A corresponding decoder thus employs a corresponding Huffman decoding operation in an inverse manner to the encoding operation. Nevertheless, there are nuances to the decoding operation described below to improve efficiency and to adapt to the specificity of the encoding operation described above.

Where the encoder signals in a header or other configuration metadata that a RLE or Huffman coding operation has been used, the decoder may first identify that a Huffman decoding operation should be applied to the stream. Similarly, in the manner described above, the decoder may identify from the data stream whether or not Huffman coding has been used by identifying the number of parts of the stream. If there is a header part and a data part, then a Huffman decoding operation should be applied. If there is only a data part to the stream then only an RLE decoding part may be applied.

The entropy decoder performs the reverse transformations of the decoder. In the present example, Huffman decoding followed by Run Length Decoding.

The following example describes a decoding process in which the bitstream has been encoded using a canonical Huffman coding operation and a run-length coding operation as described above in the example of the encoding stream. However, it will be understood that Huffman coding operations and run-length coding operations can be applied separately to decode streams encoded in a different manner.

The input to the process is an encoded bitstream. The bitstream may be retrieved from a stored file or streamed, either locally or remotely. The encoded bitstream is a series of sequential bits without an immediately discernible structure. It is only once the Huffman coding operation is applied to the bitstream can a series of symbols be deduced.

Thus, the process first applies a Huffman coding operation to the bitstream.

It is assumed that the first encoded symbol is a data value type of symbol. In this manner, where the Huffman coding operation uses different frequency tables or parameters, the Huffman coding operation can use a correct codebook for a symbol type.

The canonical Huffman coding operation must first retrieve suitable coding parameters or metadata to facilitate decoding the bitstream. In the example here, the parameters are a set of code lengths retrieved from a stream header. For simplicity, we will describe one set of code lengths being exchanged between the encoder and decoder but note that, as above, multiple sets of code lengths may be signalled so that the coding operation may use different parameters for each type of symbol it expects to be decoding.

The coding operation will assign the code lengths received in the stream header to a corresponding symbol. As noted above, the stream header may be sent in different types. Where the stream header includes set of code lengths with corresponding symbols, each code length may be associated with a corresponding symbol value. Where the code lengths are sent sequentially, the decoder may associate each code length received with a symbol in a predetermined order. For example, the code lengths may be retrieved in an order 3, 4, 6, 2, etc. The coding process may then associate each length with a corresponding symbol. Here the order is sequential—(symbol, length)—(0, 3)(1,4)(3,6)(4,2).

As illustrated in FIG. 15, some symbols may not be sent but a flag may indicate the symbol has a corresponding zero code length, that is, that symbol does not exist in the bitstream to be decoded (or is unused).

The canonical Huffman coding operation is then able to assign a code to each symbol based on the code length. For example, where the code length is 2, the code for that symbol will be '1x'. Where x indicates that the value does not important. In specific implementations, the code will be '10'.

Where the lengths are identical, the canonical Huffman coding operation assigns codes based on a sequential order of the symbols. Each code is assigned such that as the bitstream is parsed, the decoder can keep checking the next bit until only one possible code exists. For example, a first sequential symbol of length 4 may be assigned a code 1110 and a second sequential symbol of length 4 may be assigned a code 1111. Thus, parsing the bitstream, if the first bits of the bitstream are 1110x, it is only possible for the bitstream to have encoded the first sequential symbol of length 4.

Accordingly, once the coding operation has established a set of codes associated with each symbol, the coding operation can move to parsing the bitstream. In certain embodiments, the coding operation will build a tree so as to establish the symbol associated with the code of the bitstream. That is, the coding operation will take each bit of the bitstream and traverse a tree according to the value of the bit in the bitstream until a leaf is found. Once a leaf is found, the symbol associated with the leaf is output. The process continues at the root of the tree with the next bit of the bitstream. In this manner, the coding operation may output a set of symbols derived from a set of codes stored in the encoded bitstream. In preferred embodiments the symbols are each a byte, as described elsewhere herein.

The set of symbols may then be passed to a run-length coding operation. The run-length coding operation identifies the type of symbol and parses the symbol to extract a data value or a run of zeros. From the data values and runs of zeros, the operation can recreate the original residual data that was encoded.

The output of the Huffman coding is, as noted above, likely to be a set of symbols. The challenge for the next decoding step is to extract from those symbols the relevant information, noting that each symbol comprises data in a different format and each symbol will represent different information despite the information not be immediately discernible from the symbol or byte.

Figure 18:
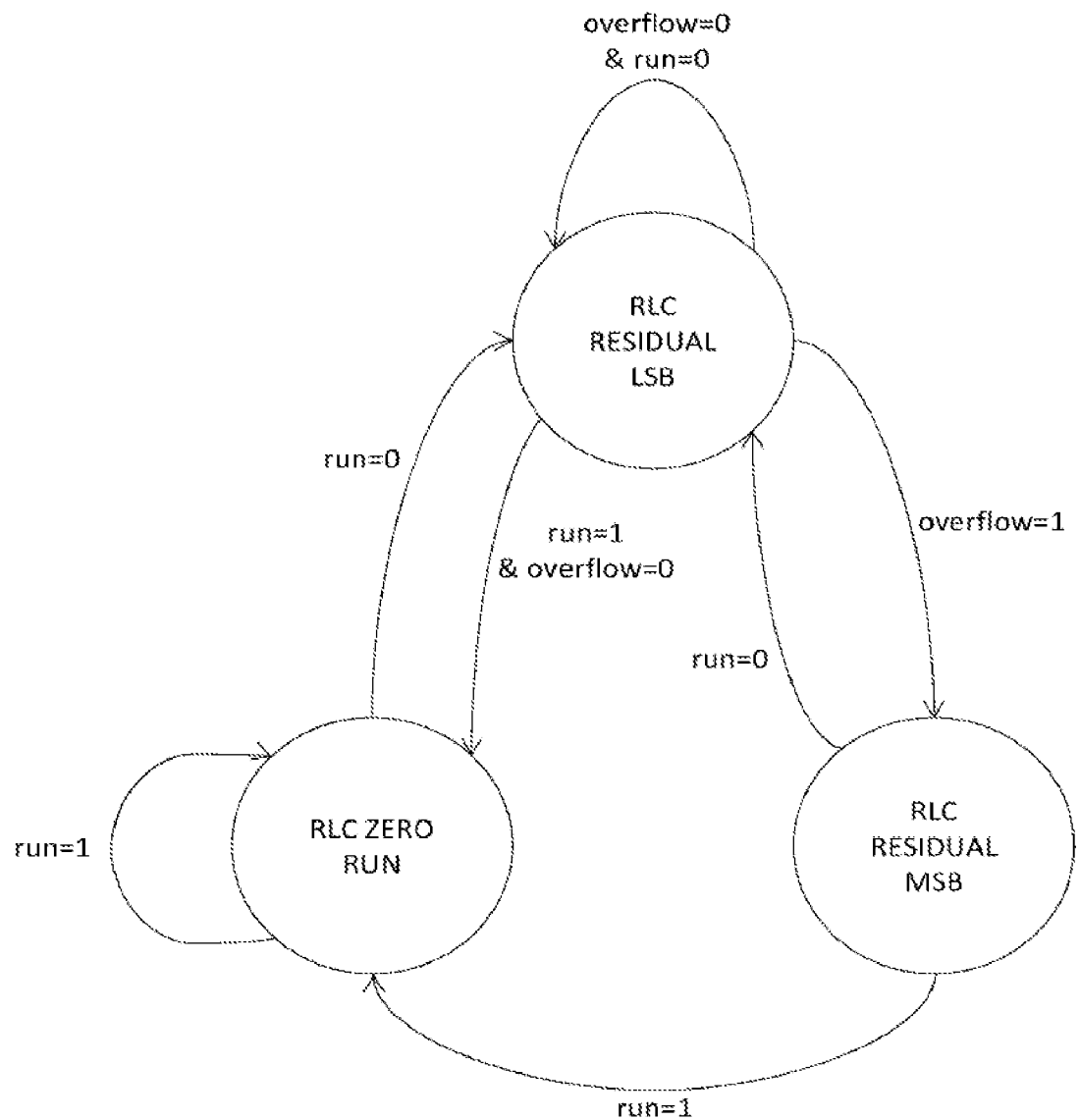
FIG. 18 shows a run-length coding state machine.

In preferred examples, the coding operation consults a state machine as illustrated in FIG. 18. In sum, the coding operation first assumes that the first symbol is a data value type (the data value can of course be 0). From this, the coding operation can identify if the byte includes an overflow flag or a run flag. The overflow and run flag are described above and illustrated in FIG. 10.

The coding operation may first check the least significant bit of the symbol (or byte). Here this is the overflow flag (or bit). If the least significant bit is set, the coding operation identifies that the next symbol will be also be a data value and by of the RLC_RESIDUAL_MSB type. The remaining bits of the symbol will be least significant bits of a data value.

The coding process goes on to parse the next symbol and extract the least significant bits as the remaining part of the data value. The bits of the first symbol can be combined with the bits of the second symbol to reconstruct the data value.

In this current symbol, illustrated in FIG. 11, there will also be a run flag, here the most significant bit. If this is set, the next symbol will be a run symbol and not a data symbol.

In the run symbol, illustrated in FIG. 12, the coding operation checks the most significant bit to indicate if the next symbol is a run symbol or a data symbol and extracts the remaining bits as the run of zeros. That is, a maximum run of 127 zeros.

If the data symbol indicates there is no overflow (in the overflow flag, here the least significant bit) then the symbol will also contain in the most significant bit a run bit and the coding operation will be able to identify from this bit that the next symbol in the set is a run symbol or a data symbol. The coding operation can thus extract the data value from bits 6-1. Here there are 31 data values available without overflow.

As noted, the state machine of FIG. 18 illustrates the process simply.

Starting at an RLC_RESIDUAL_LSB symbol, if the overflow bit=0 and the run bit=0, then the next symbol will be an RLC_RESIDUAL_LSB symbol. If the overflow bit=1 then the next symbol will be an RLC_RESIDUAL_MSB. If the overflow bit=1 there will not be a run bit. If the run bit=1 and the overflow bit=0, then the next bit will be an RLC-_ZERO_RUN symbol.

In the RLC RLC_RESIDUAL_MSB, if the run bit=0, the next symbol will be an RLC_RESIDUAL_LSB symbol. If the run bit=1, the next symbol will be an RLC_ZERO_RUN symbol.

In the RLC_ZERO_RUN symbol, if the run bit=0, the next bit will be an RLC_RESIDUAL_LSB symbol. If the run bit=1, the next bit will be an RLC_ZERO_RUN symbol.

Bits can of course be inverted (0/1, 1/0, etc.) without loss of functionality. Similarly, the locations within the symbols or bytes of the flags is merely illustrative.

The run-length coding operation can identify the next symbol in the set of symbols and extract either a data value or a run of zeros. The coding operation can then combine these values and zeros to recreate the residual data. The order may be in the order extracted or alternatively in some predetermined order.

The coding operation can thus output residual data which has been encoded into the bytestream.

It was described above how multiple metadata or coding parameters may be used in the encoding process. At the decoding side, the coding operation may include a feedback between the operations. That is, the expected next symbol may be extracted from the current symbol (e.g. using the overflow and run bits) and the expected next symbol given to the Huffman coding operation.

The Huffman coding operation may optionally generate a separate codebook for each type of symbol (and retrieve multiple stream headers or build a table of multiple codes and symbols).

Assuming the first symbol will be a data value, the Huffman coding operation will decode the first code to match a symbol of that type. From the matched symbol, the coding operation can identify an overflow bit and/or a run bit and identify the next type of symbol. The Huffman coding operation can then use a corresponding codebook for that type of symbol to extract the next code in the bitstream. The process carries in this iterative manner using the currently decoded symbol to extract an indication of the next symbol and change codebooks accordingly.

It has been described above how a decoding operation can combine a Huffman coding operation, preferably a canonical Huffman coding operation, and a run-length coding operation to recreate residual data from an encoded bitstream. It will be understood that the techniques of the run-length coding operation can be applied to a bytestream that has not been encoded using a Huffman encoding operation. Similarly, the Huffman coding operation may be applied without the subsequent step of the run-length coding operation.

The following describes an example of specific implementation steps of the decoder. In the example implementation, if the stream has more than one part, the following steps are performed:

1. Read the code lengths from the stream header (e.g. using a ReadCodeLengths function):
   a. Set code lengths for each symbol;
   b. Assign codes to symbols from the code lengths (e.g. using an AssignCodes function); and
   c. Generate a table for searching the subsets of codes with identical lengths. Each element of the table records the first index of a given length and the corresponding code (firstIdx, firstCode).
2. Decode the RLE data:
   a. Set RLE context to RLC_RESIDUAL_LSB.
   b. Decode the current code searching for the right code length in the generated table and indexing into code array with: firstIdx−(current_code−firstCode). This works because all codes for a given length are sequential by construction of the Huffman tree.

c. Use the RLE state machine to get next context (see FIG. 18). If the stream is not empty, goto b.

The Run Length Decoder reads the run length encoded data byte by byte. By construction the context of the first byte of data is guaranteed to be RLC_RESIDUAL_LSB. The decoder uses the state machine shown in FIG. 18 to determine the context of the next byte of data. The context tells the decoder how to interpret the current byte of data as described above.

Note that in this specific implementation example the run length state machine is also used by the Huffman encoding and decoding process to know which Huffman code to use for the current symbol or code word.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

In the present application, we have described a method for encoding and decoding a signal, in particular a video signal and/or an image signal.

In particular, there is described a method of encoding a signal, the method comprising receiving an input frame and processing the input frame to generate at least one first set of residual data, said residual data enabling a decoder to reconstruct the original frame from a reference reconstructed frame.

In one embodiment, the method comprises obtaining the reconstructed frame from a decoded frame obtained from a decoding module, wherein the decoding module is configured to generate said decoded frame by decoding a first encoded frame which has been encoded according to a first encoding method. The method further comprises down-sampling the input frame to obtain a down-sampled frame, and passing said down-sampled frame to an encoding module configured to encode said down-sampled frame in accordance with the first encoding method in order to generate the first encoded frame. Obtaining the reconstructed frame may further comprise up-sampling the decoded frame to generate the reconstructed frame.

In another embodiment, the method comprises obtaining the reconstructed frame from a combination of a second set of residual data and a decoded frame obtained from a decoding module, wherein the decoding module is configured to generate said decoded frame by decoding a first encoded frame which has been encoded according to a first encoding method. The method further comprises down-sampling the input frame to obtain a down-sampled frame and passing said down-sampled frame to an encoding module configured to encode said down-sampled frame in accordance with the first encoding method in order to generate the first encoded frame. The method further comprises generating said second set of residual data by taking a difference between the decoded frame and the down-sampled frame. The method further comprises encoding said second set of residual data to generate a first set of encoded residual data. Encoding said second set of residual data may be performed according to a second encoding method. The second encoding method comprises transforming the second set of residual data into a transformed second set of residual data. Transforming the second set of residual data comprises selecting a subset of the second set of residual data, and applying a transformation on said subset to generate a corresponding subset of transformed second set of residual data. One of the subset of transformed second set of residual data may be obtained by averaging the subset of the second set of residual data. Obtaining the reconstructed frame may further comprise up-sampling the combination of the second set of residual data and a decoded frame to generate the reconstructed frame.

In one embodiment, generating the at least one set of residual data comprises taking a difference between the reference reconstructed frame and the input frame. The method further comprises encoding said first set of residual data to generate a first set of encoded residual data. Encoding said first set of residual data may be performed according to a third encoding method. The third encoding method comprises transforming the first set of residual data into a transformed first set of residual data. Transforming the first set of residual data comprises selecting a subset of the first set of residual data, and applying a transformation on said subset to generate a corresponding subset of transformed first set of residual data. One of the subsets of transformed first set of residual data may be obtained by the difference between an average of a subset of the input frame and a corresponding element of the combination of the second set of residual data and the decoded frame.

In particular, there is described a method of decoding a signal, the method comprising receiving an encoded frame and at least one set of encoded residual data. The first encoded frame may be encoded using a first encoding method.

The at least one set of residual data may be encoded using a second and/or a third encoding method.

The method further comprises passing the first encoded frame to a decoding module, wherein the decoding module is configured to generate a decoded frame by decoding the encoded frame which has been encoded according to a first encoding method.

The method may further comprise decoding the at least one set of encoded residual data according to the respective encoding method used to encode them.

In one embodiment, a first set of encoded residual data is decoded by applying a second decoding method corresponding to said second encoding method to obtain a first set of decoded residual data. The method further comprises combining the first set of residual data with the decoded frame to obtain a combined frame. The method further comprises up-sampling the combined frame to obtain a reference decoded frame.

The method further comprises decoding a second set of encoded residual data by applying a third decoding method corresponding to said third encoding method to obtain a second set of decoded residual data. The method further comprises combining the second set of decoded residual data with the reference decoded frame to obtain a reconstructed frame.

In another embodiment, the method comprises up-sampling the decoded frame to obtain a reference decoded frame.

The method further comprises decoding a set of encoded residual data by applying a second or third decoding method corresponding to said second or third encoding method to obtain a set of decoded residual data. The method further comprises combining the set of decoded residual data with the reference decoded frame to obtain a reconstructed frame.

The following statements describe preferred or exemplary aspects described and illustrated herein.

A method of encoding an input video into a plurality of encoded streams, such that the encoded streams may be combined to reconstruct the input video, the method comprising:
receiving a full resolution input video;
downsampling the full resolution input video to create a downsampled video;
encoding the downsampled video using a first codec to create a base encoded stream;
reconstructing a video from the encoded video to generate a reconstructed video;
comparing the reconstructed video to the input video; and,
creating one or more further encoded streams based on the comparison.

The input video compared to the reconstructed video may be the downsampled video.

According to an example method, comparing the reconstructed video to the input video comprises:
comparing the reconstructed video to the downsampled video to create a first set of residuals and wherein creating the one or more further encoded streams comprises encoding the first set of residuals to create a first level encoded stream.

The input video compared to the reconstructed video may be the full resolution input video and the reconstructed video may be upsampled.

According to an example method, comparing the reconstructed video to the input video comprises:
upsampling the reconstructed video to generate an up-sampled reconstructed video; and,
comparing the up-sampled reconstructed video to the full resolution input video to create a second set of residuals and wherein creating the one or more further encoded streams comprises encoding the second difference to create a second level encoded stream.

Accordingly, in an example, the method may generate a base encoded stream, a first level encoded stream and a second level encoded stream according to the above defined example methods. Each of the first level encoded stream and the second level encoded stream may contain enhancement data used by a decoder to enhance the encoded base stream.

Residuals may be a difference between two videos or frames.

The encoded streams may be accompanied by one or more headers which include parameters indicating aspects of the encoding process to facilitate decoding. For example, the headers may include the codec used, the transform applied, the quantization applied, and/or other decoding parameters.

It was described above how a step of ranking and selecting may be applied to the residual data, a step of subtracting temporal coefficients may be performed and also that quantization may be adapted. Each of these steps may be predetermined and selectively applied or may be applied based on analysis of the input video, downsampled video, reconstructed video, upsampled video or any combination of the above to improve the overall performance of the encoder. The steps may be selectively applied based on a predetermined set of rules or determinatively applied based on the analysis or feedback of the performance.

An example method, further comprises:
sending the base encoded stream.
An example method, further comprises:
sending the first level encoded stream.
An example method, further comprises:
sending the second level encoded stream.

According to a further aspect of the present disclosure there is provided a decoding method.

A method of decoding a plurality of encoded streams into a reconstructed output video, the method comprising:
receiving a first base encoded stream;
decoding the first base encoded stream according to a first codec to generate a first output video;
receiving one or more further encoded streams;
decoding the one or more further encoded streams to generate a set of residuals; and,
combining the set of residuals with the first video to generate a decoded video.

In an example, the method comprises retrieving a plurality of decoding parameters from a header. The decoding parameters may indicate which procedural steps were included in the encoding process.

In an example the method may comprise receiving a first level encoded stream and receiving a second level encoded stream. In this example the step of decoding the one or more further encoded streams to generate a set of residuals comprises:
decoding the first level encoded stream to derive a first set of residuals; wherein the step of combining the set of residuals with the first video to generate a decoded video, comprises:
combining the first set of residuals with the first output video to generate a second output video;
upsampling the second output video to generate an up-sampled second output video;
decoding the second level encoded stream to derive a second set of residuals; and,
combining the second set of residuals with the second output video to generate a reconstructed output video.

The method may further comprise displaying or outputting the reconstructed output.

The invention claimed is:

1. A method of encoding a video signal, the method comprising:
   receiving an input frame;
   processing the input frame to generate residual data, the residual data enabling a decoder to reconstruct the input frame from a reference reconstructed frame;
   applying a modified run-length coding operation to the residual data where each value in the residual data is sent as a value and where each zero in the residual data is sent as a run of multiple consecutive zeros, wherein the modified run-length coding operation comprises generating a run-length encoded bytestream comprising a set of symbols representing non-zero data values of the residual data and counts of consecutive zero values of the residual data;
   applying a Huffman coding operation to the set of symbols to generate Huffman encoded data comprising a set of codes representing the run-length encoded bytestream; and
   in response to a determination that a number of the non-zero data values exceeds a threshold, selecting a header type that is structured to include bits representing a difference between a code length of one of the symbols in the set of symbols and a minimum length of a code used to encode the one symbol, where said code is included in the set of codes.

2. A method according to claim 1, wherein the modified run-length coding operation comprises:
   encoding non-zero data values of the residual data into at least a first type of symbol; and
   encoding counts of consecutive zero values into a second type of symbol, such that the residual data is encoded as a sequence of symbols of different types.

3. A method according to claim 1, wherein the modified run-length coding operation comprises:
   encoding data values of the residual data into a first type of symbol and a third type of symbol, the first and third types of symbol each comprising a part of a data value, such that the parts can be combined at a decoder to reconstruct the data value.

4. A method according to claim 3, wherein the modified run-length coding operation comprises:
   comparing a size of each data value of the residual data to be encoded to a second threshold; and
   encoding each data value into the first type of symbol if the size is below the second threshold and encoding a part of each data value into the first type of symbol and a part of each data value into the third type of symbol if the size is above the second threshold.

5. A method according to claim 4, further comprising:
   if the size is above the second threshold, setting a flag in the symbol of the first type of symbol indicating a part of the represented data value is encoded into a further symbol of the third type of symbol.

6. A method according to claim 2, further comprising:
   inserting a flag in each symbol indicating a type of symbol encoded next in the run-length encoded bytestream.

7. A method according to claim 1, wherein the Huffman coding operation is a canonical Huffman coding operation, such that the Huffman encoded data comprises a code length for each unique symbol of the set of symbols, the code length representing a length of a code used to encode a corresponding symbol.

8. A method according to claim 1, further comprising:
   comparing a data size of at least a portion of the run-length encoded bytestream to a data size of at least a portion of the Huffman encoded data; and
   outputting the run-length encoded bytestream or the Huffman encoded data in an output bitstream based on the comparison.

9. A method according to claim 8, further comprising:
   adding a flag to configuration metadata accompanying the output bitstream indicating if the bitstream represents the run-length encoded bytestream or the Huffman encoded data.

10. A method according to claim 1, wherein the Huffman coding operation comprises:
    generating a separate frequency table for symbols of the first type of symbol and symbols of the second type of symbol.

11. A method according to claim 7, further comprising:
    generating a particular stream header, which is included among said stream headers, wherein generating the particular stream header includes generating an indication of a plurality of code lengths, such that a decoder can derive code lengths and respective corresponding symbols for a canonical Huffman decoding operation.

12. A method according to claim 11, wherein the particular stream header is a first type of stream header, and wherein an indication of the symbol associated with a respective code length of the plurality of code lengths is provided.

13. A method according to claim 11, wherein the particular stream header is a second type of stream header and the method further comprises ordering the plurality of code lengths in the stream header based on a predetermined order of symbols corresponding to each of the code lengths, such that the code lengths can be associated with a corresponding symbol at the decoder.

14. A method according to claim 13, wherein the second type of stream header further comprises a flag indicating a symbol in the predetermined order of the possible set of symbols does not exist in the set of symbols in the run-length encoded bytestream.

15. A method according to claim 1, wherein the modified run-length coding operation comprises:
    encoding the non-zero data values of the residual data into at least a first type of symbol;
    encoding the counts of the consecutive zero values of the residual data into a second type of symbol, such that the residual data is encoded as a sequence of symbols of different types; and
    inserting a flag in each symbol of the second type of symbol indicating whether a subsequent symbol of the set of symbols comprises the first type of symbol or the second type of symbol.

16. An encoding apparatus configured to:
    receive an input frame;
    process the input frame to generate residual data, the residual data enabling a decoder to reconstruct the input frame from a reference reconstructed frame;
    apply a modified run-length coding operation to the residual data where each value in the residual data is sent as a value and where each zero in the residual data is sent as a run of multiple consecutive zeros, wherein the modified run-length coding operation comprises generating a run-length encoded bytestream comprising a set of symbols representing non-zero data values of the residual data and counts of consecutive zero values of residual data;

apply a Huffman coding operation to the set of symbols to generate Huffman encoded data comprising a set of codes representing the run-length encoded bytestream; and in response to a determination that a number of the non-zero data values exceeds a threshold, select a header type that is structured to include bits representing a difference between a code length of one of the symbols in the set of symbols and a minimum length of a code used to encode the one symbol, where said code is included in the set of codes.

17. A non-transitory computer readable medium comprising instructions that are executable by one or more processors cause the one or more processors to:

receive an input frame;

process the input frame to generate residual data, the residual data enabling a decoder to reconstruct the input frame from a reference reconstructed frame;

apply a modified run-length coding operation to the residual data where each value in the residual data is sent as a value and where each zero in the residual data is sent as a run of multiple consecutive zeros, wherein the modified run-length coding operation comprises generating a run-length encoded bytestream comprising a set of symbols representing non-zero data values of the residual data and counts of consecutive zero values of residual data;

apply a Huffman coding operation to the set of symbols to generate Huffman encoded data comprising a set of codes representing the run-length encoded bytestream; and in response to a determination that a number of the non-zero data values exceeds a threshold, select a header type that is structured to include bits representing a difference between a code length of one of the symbols in the set of symbols and a minimum length of a code used to encode the one symbol, where said code is included in the set of codes.

* * * * *